US012665740B2

(12) United States Patent
Pan et al.

(10) Patent No.: US 12,665,740 B2
(45) Date of Patent: Jun. 23, 2026

(54) METHODS AND APPARATUSES FOR JOINTLY PROCESSING DATA BY TWO PARTIES FOR DATA PRIVACY PROTECTION

(71) Applicant: Alipay (Hangzhou) Information Technology Co., Ltd., Zhejiang (CN)

(72) Inventors: Wuqiong Pan, Hangzhou (CN); Tao Wei, Hangzhou (CN); Tingting Li, Hangzhou (CN); Zhenqiang Wei, Hangzhou (CN); Haonan Feng, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 157 days.

(21) Appl. No.: 18/400,689

(22) Filed: Dec. 29, 2023

(65) Prior Publication Data

US 2024/0137206 A1    Apr. 25, 2024

Related U.S. Application Data

(63) Continuation of application No. PCT/CN2022/125430, filed on Oct. 14, 2022.

(30) Foreign Application Priority Data

Dec. 24, 2021    (CN) .......................... 202111601087.4

(51) Int. Cl.
 H04L 9/00 (2022.01)
 G06F 21/60 (2013.01)
 G06F 21/62 (2013.01)
(52) U.S. Cl.
 CPC ............ H04L 9/008 (2013.01); G06F 21/602 (2013.01); G06F 21/6245 (2013.01)

(58) Field of Classification Search
 CPC . H04L 9/008; H04L 2209/08; H04L 2209/42; H04L 2209/46; H04L 9/3093; G06F 21/602; G06F 21/6245
 See application file for complete search history.

(56) References Cited

U.S. PATENT DOCUMENTS

| | | | | |
|---|---|---|---|---|
| 10,075,288 | B1 * | 9/2018 | Khedr ..................... H04L 9/008 |
| 2015/0063563 | A1 * | 3/2015 | Vaya ......................... G06F 7/72 |
| | | | | 380/30 |

(Continued)

FOREIGN PATENT DOCUMENTS

| | | |
|---|---|---|
| CN | 111160573 | 5/2020 |
| CN | 111162896 | 5/2020 |

(Continued)

OTHER PUBLICATIONS

Huang et al., "Secure two-party distance computation protocol based on privacy homomorphism and scalar product in wireless sensor networks," Tsinghua Science and Technology, Aug. 11, 2016, 21(4):385-96.

(Continued)

*Primary Examiner* — Meng Li
(74) *Attorney, Agent, or Firm* — Fish & Richardson P.C.

(57) ABSTRACT

Embodiments of this specification provide methods and apparatuses for data privacy protection. An embodiment of the methods comprises receiving, by a first party from a second party, an encrypted integrated vector, determining an encrypted result vector based on the original matrix and the encrypted integrated vector, determining a data processing result based on the encrypted result vector, and sending the data processing result to the second party for the second party to obtain a multiplication calculation result of the original matrix and the n original vectors based on the data processing result.

20 Claims, 8 Drawing Sheets

(56) References Cited

U.S. PATENT DOCUMENTS

| | | | | |
|---|---|---|---|---|
| 2019/0228101 A1* | 7/2019 | Miranda | ................ | G06N 20/00 |
| 2021/0058229 A1* | 2/2021 | Jiang | ................... | G06F 21/6245 |
| 2021/0058241 A1* | 2/2021 | Georgieva | ............. | H04L 9/085 |
| 2021/0081817 A1* | 3/2021 | Chen | ...................... | G06N 3/045 |
| 2022/0374542 A1* | 11/2022 | Ghazi | ................. | G06F 21/6254 |
| 2024/0137206 A1* | 4/2024 | Pan | ......................... | H04L 9/008 |

FOREIGN PATENT DOCUMENTS

| | | |
|---|---|---|
| CN | 112507372 | 3/2021 |
| CN | 112906030 | 6/2021 |
| CN | 112989368 | 6/2021 |
| CN | 113407979 | 9/2021 |
| CN | 113542228 | 10/2021 |
| CN | 113626841 | 11/2021 |
| CN | 113987559 | 1/2022 |
| CN | 114884645 | 8/2022 |
| CN | 115865307 | 3/2023 |
| WO | WO 2020254248 | 12/2020 |
| WO | WO 2021197037 | 10/2021 |

OTHER PUBLICATIONS

International Search Report and Written Opinion in International Appln. No. PCT/CN2022/125430, mailed on Dec. 23, 2022, 12 pages (with English translation).

Wang et al., "Privately Computing No. of Equal Components of Two Private Vectors and Its Applications," Journal of Cryptologic Research, Apr. 30, 2020, 7(2):145-157 (with English Abstract).

Zhao, "research on theory of practical secure two-party computation," dessersation for doctoral degree, Shangdong University, school of computer science and technology, Jun. 30, 2016, 139 pages (with English Abstract).

Extended European Search Report in European Appln. No. 22909462.8, mailed on Sep. 10, 2024, 10 pages.

Hu, "Improving the Efficiency of Homomorphic Encryption Schemes," dissertation for the degree of Doctor of Philosophy, School of Electrical and Computer Engineering, Worcester Polytechnic Institute, May 1, 2013, 103 pages.

International Preliminary Report on Patentability in International Appln. No. PCT/CN2022/125430, mailed on Jul. 4, 2024, 11 pages (with English translation).

* cited by examiner

Scenario (A) Scenario (B)

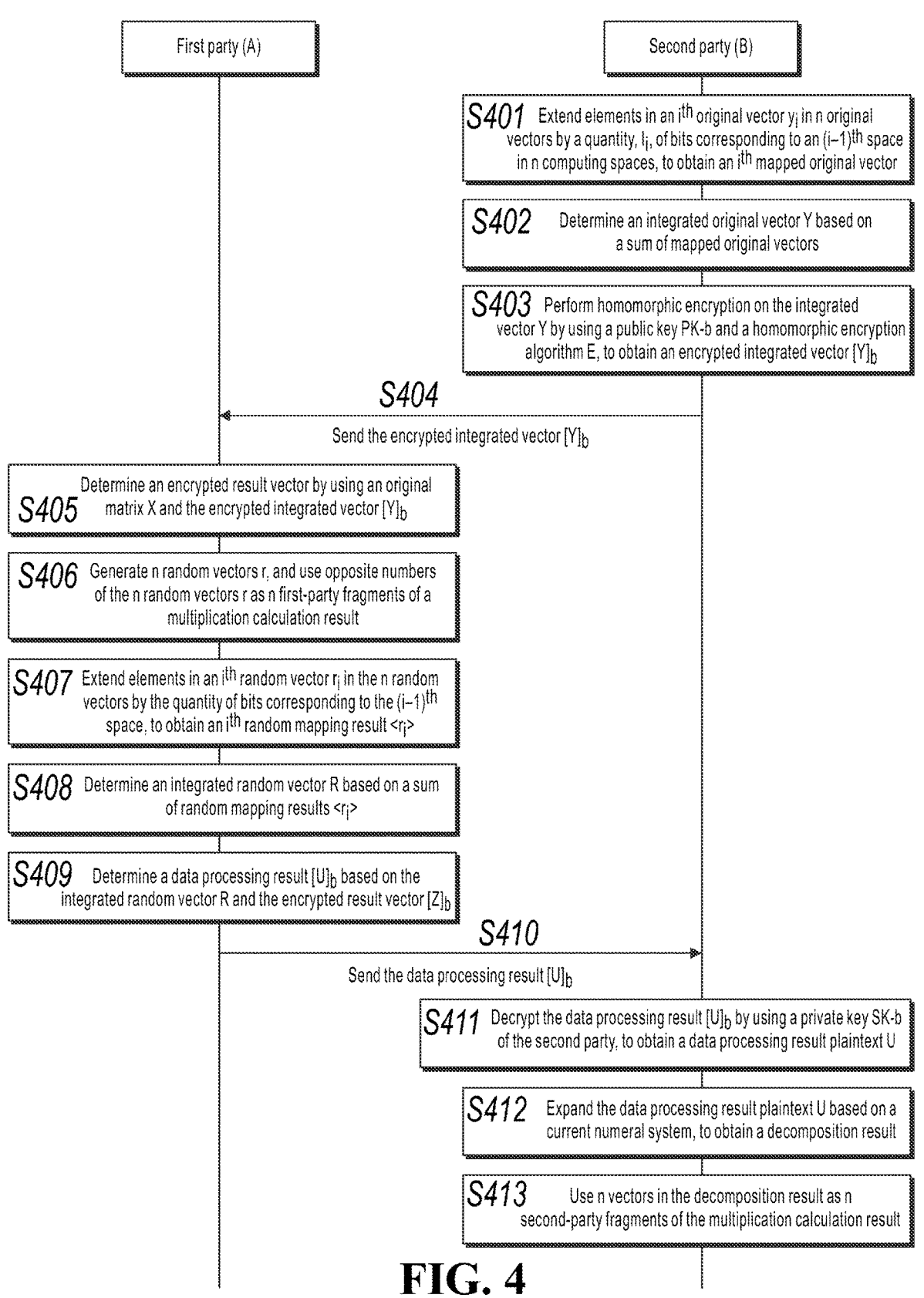

First party (A)

Second party (B)

S401  Extend elements in an $i^{th}$ original vector $y_i$ in n original vectors by a quantity, $l_i$, of bits corresponding to an $(i-1)^{th}$ space in n computing spaces, to obtain an $i^{th}$ mapped original vector S402  Determine an integrated original vector Y based on a sum of mapped original vectors S403  Perform homomorphic encryption on the integrated vector Y by using a public key PK-b and a homomorphic encryption algorithm E, to obtain an encrypted integrated vector $[Y]_b$ S404
Send the encrypted integrated vector $[Y]_b$ S405  Determine an encrypted result vector by using an original matrix X and the encrypted integrated vector $[Y]_b$ S406  Generate n random vectors $r_i$ and use opposite numbers of the n random vectors r as n first-party fragments of a multiplication calculation result S407  Extend elements in an $i^{th}$ random vector $r_i$ in the n random vectors by the quantity of bits corresponding to the $(i-1)^{th}$ space, to obtain an $i^{th}$ random mapping result $<r_i>$ S408  Determine an integrated random vector R based on a sum of random mapping results $<r_i>$ S409  Determine a data processing result $[U]_b$ based on the integrated random vector R and the encrypted result vector $[Z]_b$ S410
Send the data processing result $[U]_b$ S411  Decrypt the data processing result $[U]_b$ by using a private key SK-b of the second party, to obtain a data processing result plaintext U S412  Expand the data processing result plaintext U based on a current numeral system, to obtain a decomposition result S413  Use n vectors in the decomposition result as n second-party fragments of the multiplication calculation result

FIG. 4

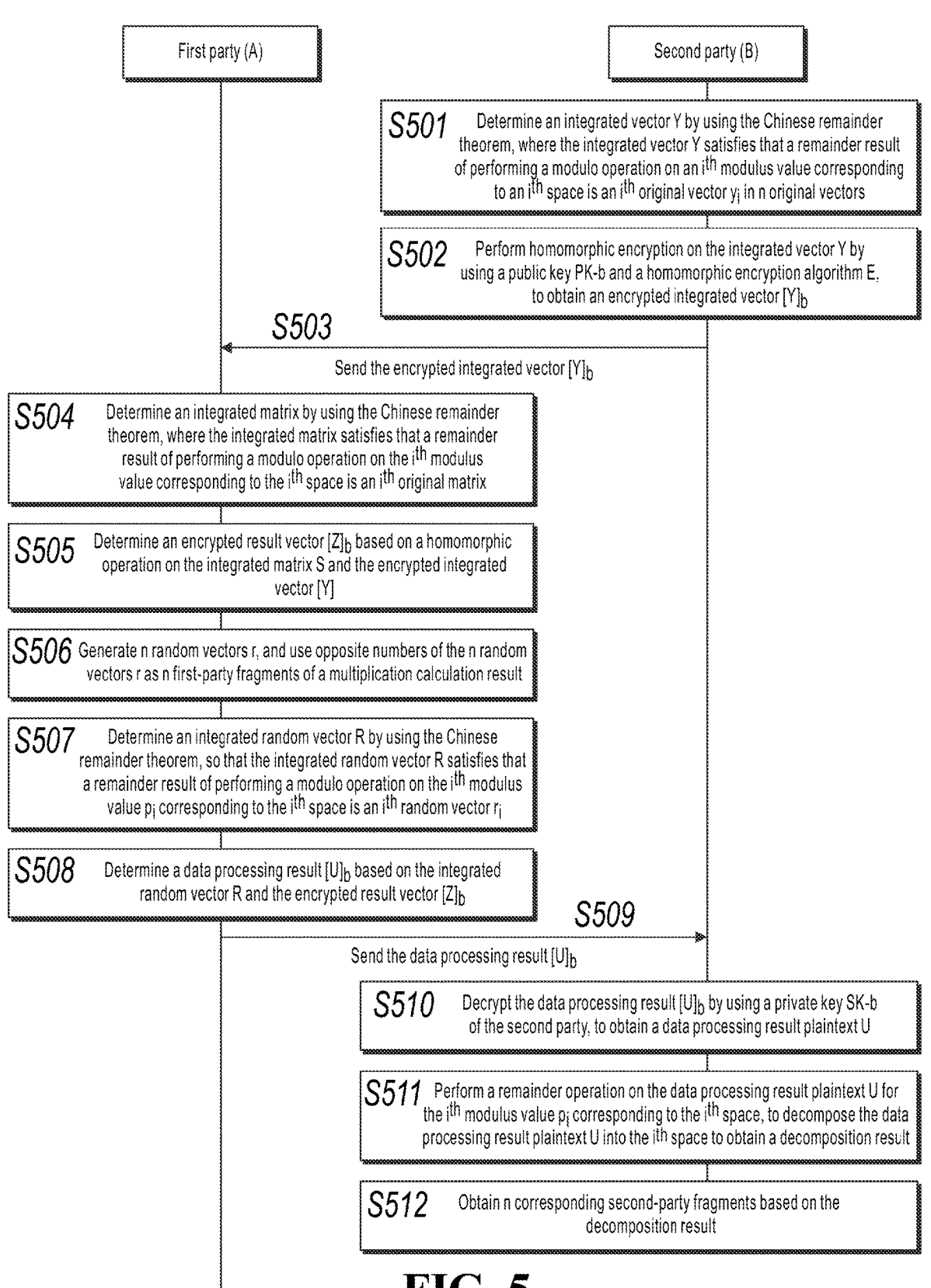

First party (A)

Second party (B)

S501 — Determine an integrated vector Y by using the Chinese remainder theorem, where the integrated vector Y satisfies that a remainder result of performing a modulo operation on an $i^{th}$ modulus value corresponding to an $i^{th}$ space is an $i^{th}$ original vector $y_i$ in n original vectors S502 — Perform homomorphic encryption on the integrated vector Y by using a public key PK-b and a homomorphic encryption algorithm E, to obtain an encrypted integrated vector $[Y]_b$ S503 — Send the encrypted integrated vector $[Y]_b$ S504 — Determine an integrated matrix by using the Chinese remainder theorem, where the integrated matrix satisfies that a remainder result of performing a modulo operation on the $i^{th}$ modulus value corresponding to the $i^{th}$ space is an $i^{th}$ original matrix S505 — Determine an encrypted result vector $[Z]_b$ based on a homomorphic operation on the integrated matrix S and the encrypted integrated vector $[Y]$ S506 — Generate n random vectors r, and use opposite numbers of the n random vectors r as n first-party fragments of a multiplication calculation result S507 — Determine an integrated random vector R by using the Chinese remainder theorem, so that the integrated random vector R satisfies that a remainder result of performing a modulo operation on the $i^{th}$ modulus value $p_i$ corresponding to the $i^{th}$ space is an $i^{th}$ random vector $r_i$ S508 — Determine a data processing result $[U]_b$ based on the integrated random vector R and the encrypted result vector $[Z]_b$ S509 — Send the data processing result $[U]_b$ S510 — Decrypt the data processing result $[U]_b$ by using a private key SK-b of the second party, to obtain a data processing result plaintext U S511 — Perform a remainder operation on the data processing result plaintext U for the $i^{th}$ modulus value $p_i$ corresponding to the $i^{th}$ space, to decompose the data processing result plaintext U into the $i^{th}$ space to obtain a decomposition result S512 — Obtain n corresponding second-party fragments based on the decomposition result

FIG. 5

METHODS AND APPARATUSES FOR JOINTLY PROCESSING DATA BY TWO PARTIES FOR DATA PRIVACY PROTECTION

CROSS-REFERENCE TO RELATED APPLICATIONS

This application is a continuation of PCT Application No. PCT/CN2022/125430, filed on Oct. 14, 2022, which claims priority to Chinese Patent Application No. 202111601087.4, filed on Dec. 24, 2021, and each application is hereby incorporated by reference in its entirety.

TECHNICAL FIELD

This specification relates to the field of data security technologies, and in particular, to methods and apparatuses for jointly processing data by two parties for data privacy protection.

BACKGROUND

In the big data background, service data of different data parties usually need to be comprehensively processed. For example, in machine learning-based merchant classification analysis scenarios, electronic payment platforms own transaction flow data of merchants, electronic commerce platforms store sales data of the merchants, banking institutions own loan data of the merchants, and modeling parties own modeling parameter data. In a process of jointly processing data of a plurality of parities, protection and security of data privacy have become a concern.

In the process of jointly processing the data of the plurality of parties, multiplication calculation needs to be performed on the data of the plurality of parties in many scenarios. For example, in some scenarios, party A owns user sample feature data to be processed, and party B owns a data processing model. When the sample feature data are processed by using the data processing model, multiplication calculation needs to be performed on the user sample feature data and model parameters of the data processing model. If party A directly sends the sample data to party B, a user sample feature value is exposed, and user privacy is leaked. If party B provides the data processing model to party A for use, the model parameters of the data processing model are exposed.

Therefore, it is desired to provide an improved solution to protect security of privacy data of each party in a process of jointly processing data by a plurality of parties.

SUMMARY

One or more embodiments of this specification provide methods and apparatuses for jointly processing data by two parties for data privacy protection, to reduce a calculation amount while protecting security of privacy data of each party.

According to a first aspect, a method for jointly processing data by two parties for data privacy protection is provided. The two parties include a first party and a second party, the first party owns an original matrix formed by privacy data, the second party owns n original vectors formed by privacy data, the method is performed by the first party, and the method includes the following: receiving an encrypted integrated vector from the second party, where the encrypted integrated vector is obtained by encrypting an integrated vector by using a public key of the second party and a homomorphic encryption algorithm, the integrated vector is a combination of mapping results of the n original vectors in n corresponding computing spaces, and the n computing spaces are different from each other and are isolated from each other; determining an encrypted result vector by using the original matrix and the encrypted integrated vector; and determining a data processing result based on at least the encrypted result vector, and sending the data processing result to the second party, so that the second party obtains a multiplication calculation result of the original matrix and the n original vectors based on the data processing result.

In some feasible methods, space sizes of the n computing spaces are determined based on at least maximum effective bit widths of element products of the original matrix and the original vectors.

In some feasible methods, the determining a data processing result based on at least the encrypted result vector includes the following: generating n random vectors, and using opposite numbers of the n random vectors as n first-party fragments of the multiplication calculation result; combining mapping results of the n random vectors in the n computing spaces to obtain an integrated random vector; and determining the data processing result based on the integrated random vector and the encrypted result vector, so that the second party obtains n second-party fragments of the multiplication calculation result.

In some feasible methods, the first party owns one original matrix, and the n computing spaces are n spaces with different quantities of bits in a current numeral system; and the combining mapping results of the n random vectors in the n computing spaces includes the following: extending elements in an $i^{th}$ random vector in the n random vectors by a quantity of bits corresponding to an $i^{th}$ space, to obtain an $i^{th}$ random mapping result; and determining the integrated random vector based on a sum of random mapping results.

In some feasible methods, a difference between quantities of bits of the $i^{th}$ space and an $(i-1)^{th}$ space is determined based on a maximum effective bit width of an element product of the original matrix and an $(i-1)^{th}$ original vector and excess mask bit widths predetermined for the n random vectors.

In some feasible methods, the first party owns n original matrices, the n computing spaces are modulo spaces corresponding to n modulus values, and the n modulus values are coprime numbers; and the determining an encrypted result vector includes the following: determining an integrated matrix by using the Chinese remainder theorem, where the integrated matrix satisfies that a remainder result of performing a modulo operation on an $i^{th}$ modulus value corresponding to an $i^{th}$ space is an $i^{th}$ original matrix; and obtaining the encrypted result vector based on a homomorphic operation on the integrated matrix and the encrypted integrated vector.

In some feasible methods, the first party owns n original matrices, the n computing spaces are modulo spaces corresponding to n modulus values, and the n modulus values are coprime numbers; the determining an encrypted result vector includes the following: determining an integrated matrix by using the Chinese remainder theorem, where the integrated matrix satisfies that a remainder result of performing a modulo operation on an $i^{th}$ modulus value corresponding to an $i^{th}$ space is an $i^{th}$ original matrix; and obtaining the encrypted result vector based on a homomorphic operation on the integrated matrix and the encrypted integrated vector; and the obtaining an integrated random vector includes the following: determining the integrated random vector by using the Chinese remainder theorem, so that the integrated random vector satisfies that a remainder result of performing a modulo operation on the $i^{th}$ modulus value corresponding to the $i^{th}$ space is an $i^{th}$ random vector.

In some feasible methods, a bit width of the $i^{th}$ modulus value is determined based on a maximum effective bit width of an element product of the $i^{th}$ original matrix and an $i^{th}$ original vector and excess mask bit widths predetermined for the n random vectors.

In some feasible methods, the determining the data processing result based on the integrated random vector and the encrypted result vector includes the following: generating a target random vector, where bit widths of elements in the target random vector are determined based on the maximum effective bit widths, the excess mask bit widths, and a quantity of original matrices; multiplying the target random vector by the n modulus values, and superimposing an obtained multiplication result onto the integrated random vector to obtain an extended random vector; and homomorphically superimposing the extended random vector onto the encrypted result vector to obtain the data processing result.

According to a second aspect, a method for jointly processing data by two parties for data privacy protection is provided. The two parties include a first party and a second party, the first party owns an original matrix formed by privacy data, the second party owns n original vectors formed by privacy data, the method is performed by the second party, and the method includes the following: combining mapping results of the n original vectors in n computing spaces to obtain an integrated vector, where the n computing spaces are different from each other and are isolated from each other; encrypting the integrated vector by using a public key of the second party and a homomorphic encryption algorithm, to obtain an encrypted integrated vector, and sending the encrypted integrated vector to the first party; receiving a data processing result from the first party, where the data processing result is determined by the first party based on at least an encrypted result vector, and the encrypted result vector is determined based on the original matrix and the encrypted integrated vector; and decrypting the data processing result, decomposing the data processing result into the n computing spaces, and obtaining a multiplication calculation result of the original matrix and the n original vectors based on a decomposition result.

In some feasible methods, space sizes of the n computing spaces are determined based on at least maximum effective bit widths of element products of the original matrix and the original vectors.

In some feasible methods, the data processing result is determined by the first party based on the encrypted result vector and an integrated random vector, the integrated random vector is obtained by the first party by combining mapping results of n random vectors in the n computing spaces, and opposite numbers of the n random vectors are used as n first-party fragments of the multiplication calculation result; and the obtaining a multiplication calculation result of the original matrix and the n original vectors based on a decomposition result includes the following: using n vectors in the decomposition result as n second-party fragments of the multiplication calculation result.

In some feasible methods, the first party owns one original matrix, and the n computing spaces are n spaces with different quantities of bits in a current numeral system; and the obtaining an integrated vector includes the following: extending elements in an $i^{th}$ original vector in the n original vectors by a quantity of bits corresponding to an $i^{th}$ space, to obtain an $i^{th}$ vector mapping result; and obtaining the integrated vector based on a sum of vector mapping results.

In some feasible methods, the first party owns n original matrices, the n computing spaces are modulus spaces corresponding to n modulus values, and the n modulus values are coprime numbers; and the obtaining an integrated vector includes the following: determining the integrated vector by using the Chinese remainder theorem, where the integrated vector satisfies that a remainder result of performing a modulo operation on an $i^{th}$ modulus value corresponding to an $i^{th}$ space is an $i^{th}$ original vector.

In some feasible methods, the second party owns an original vector set, and the n original vectors are some vectors in the original vector set, so that a space sum of the n corresponding computing spaces is not greater than a homomorphic plaintext space size corresponding to the homomorphic encryption algorithm.

According to a third aspect, a method for jointly processing data by two parties for data privacy protection is provided. The two parties include a first party and a second party, the first party owns an original matrix formed by privacy data, the second party owns n original vectors formed by privacy data, and the method includes the following:

The second party combines mapping results of the n original vectors in n computing spaces to obtain an integrated vector; and encrypts the integrated vector by using a public key of the second party and a homomorphic encryption algorithm, to obtain an encrypted integrated vector, and sends the encrypted integrated vector to the first party, where the n computing spaces are different from each other and are isolated from each other; the first party receives the encrypted integrated vector, and determines an encrypted result vector by using the original matrix and the encrypted integrated vector; and determines a data processing result based on at least the encrypted result vector, and sends the data processing result to the second party; and the second party receives the data processing result; and decrypts the data processing result, decomposes the data processing result into the n computing spaces, and obtains a multiplication calculation result of the original matrix and the n original vectors based on a decomposition result.

In some optional implementations, the determining a data processing result based on at least the encrypted result vector includes the following: generating n random vectors, and using opposite numbers of the n random vectors as n first-party fragments of the multiplication calculation result; combining mapping results of the n random vectors in the n computing spaces to obtain an integrated random vector; and determining the data processing result based on the integrated random vector and the encrypted result vector; and the obtaining a multiplication calculation result of the original matrix and the n original vectors based on a decomposition result includes the following: using n vectors in the decomposition result as n second-party fragments of the multiplication calculation result.

In some optional implementations, the first party owns one original matrix, and the n computing spaces are n spaces with different quantities of bits in a current numeral system; that the second party obtains an integrated vector includes the following: extending elements in an $i^{th}$ original vector in the n original vectors by a quantity of bits corresponding to an $i^{th}$ space, to obtain an $i^{th}$ vector mapping result; and obtaining the integrated vector based on a sum of vector mapping results; and that the first party combines mapping results of the n random vectors in the n computing spaces includes the following: extending elements in an $i^{th}$ random vector in the n random vectors by the quantity of bits corresponding to the $i^{th}$ space, to obtain an $i^{th}$ random mapping result; and determining the integrated random vector based on a sum of random mapping results.

In some optional implementations, the first party owns one original matrix, and the n computing spaces are n spaces with different quantities of bits in a current numeral system; and that the second party obtains an integrated vector includes the following: extending elements in an $i^{th}$ original vector in the n original vectors by a quantity of bits corresponding to an $i^{th}$ space, to obtain an $i^{th}$ vector mapping result; and obtaining the integrated vector based on a sum of vector mapping results.

In some optional implementations, the first party owns n original matrices, the n computing spaces are modulo spaces corresponding to n modulus values, and the n modulus values are coprime numbers; that the second party obtains an integrated vector includes the following: determining the integrated vector by using the Chinese remainder theorem, where the integrated vector satisfies that a remainder result of performing a modulo operation on an $i^{th}$ modulus value corresponding to an $i^{th}$ space is an $i^{th}$ original vector; and that the first party determines an encrypted result vector includes the following: determining an integrated matrix by using the Chinese remainder theorem, where the integrated matrix satisfies that a remainder result of performing a modulo operation on the $i^{th}$ modulus value corresponding to the $i^{th}$ space is an $i^{th}$ original matrix; and obtaining the encrypted result vector based on a homomorphic operation on the integrated matrix and the encrypted integrated vector.

According to a fourth aspect, an apparatus for jointly processing data by two parties for data privacy protection is provided. The two parties include a first party and a second party, the first party owns an original matrix formed by privacy data, the second party owns n original vectors formed by privacy data, the apparatus is deployed in the first party, and the apparatus includes: a first receiving module, configured to receive an encrypted integrated vector from the second party, where the encrypted integrated vector is obtained by encrypting an integrated vector by using a public key of the second party and a homomorphic encryption algorithm, the integrated vector is a combination of mapping results of the n original vectors in n corresponding computing spaces, and the n computing spaces are different from each other and are isolated from each other; a first determining module, configured to determine an encrypted result vector by using the original matrix and the encrypted integrated vector; and a second determining module, configured to determine a data processing result based on at least the encrypted result vector, and send the data processing result to the second party, so that the second party obtains a multiplication calculation result of the original matrix and the n original vectors based on the data processing result.

According to a fifth aspect, an apparatus for jointly processing data by two parties for data privacy protection is provided. The two parties include a first party and a second party, the first party owns an original matrix formed by privacy data, the second party owns n original vectors formed by privacy data, the apparatus is deployed in the second party, and the apparatus includes: a combination module, configured to combine mapping results of the n original vectors in n computing spaces to obtain an integrated vector, where the n computing spaces are different from each other and are isolated from each other; an encryption module, configured to encrypt the integrated vector by using a public key of the second party and a homomorphic encryption algorithm, to obtain an encrypted integrated vector, and send the encrypted integrated vector to the first party; a second receiving module, configured to receive a data processing result from the first party, where the data processing result is determined by the first party based on at least an encrypted result vector, and the encrypted result vector is determined based on the original matrix and the encrypted integrated vector; and a decryption and acquisition module, configured to decrypt the data processing result, decompose the data processing result into the n computing spaces, and obtain a multiplication calculation result of the original matrix and the n original vectors based on a decomposition result.

According to a sixth aspect, a system for jointly processing data by two parties for data privacy protection is provided. The system includes a first party and a second party, the first party owns an original matrix formed by privacy data, and the second party owns n original vectors formed by privacy data; the second party is configured to combine mapping results of the n original vectors in n computing spaces to obtain an integrated vector, where the n computing spaces are different from each other and are isolated from each other; and encrypt the integrated vector by using a public key of the second party and a homomorphic encryption algorithm, to obtain an encrypted integrated vector, and send the encrypted integrated vector to the first party; the first party is configured to receive the encrypted integrated vector, and determine an encrypted result vector by using the original matrix and the encrypted integrated vector; and determine a data processing result based on at least the encrypted result vector, and send the data processing result to the second party; and the second party is further configured to receive the data processing result; and decrypt the data processing result, and decompose the data processing result into the n computing spaces, to obtain a multiplication calculation result of the original matrix and the n original vectors.

According to a seventh aspect, a computer-readable storage medium is provided. The computer-readable storage medium stores a computer program, and when the computer program is executed on a computer, the computer is enabled to perform the method according to the first aspect.

According to an eighth aspect, a computer-readable storage medium is provided. The computer-readable storage medium stores a computer program, and when the computer program is executed on a computer, the computer is enabled to perform the method according to the second aspect.

According to a ninth aspect, a computing device is provided, and includes a memory and a processor. The memory stores executable code, and when the processor executes the executable code, the method according to the first aspect is implemented.

According to a tenth aspect, a computing device is provided, and includes a memory and a processor. The memory stores executable code, and when the processor executes the executable code, the method according to the first aspect is implemented.

According to the methods and the apparatuses provided in the embodiments of this specification, the second party maps the n original vectors owned by the second party to the n computing spaces that are different from each other and are isolated from each other, and the second party combines the obtained mapping results to obtain the integrated vector, to encode the n original vectors into one integrated vector, performs homomorphic encryption on the integrated vector, and sends the encrypted integrated vector to the first party. Calculation processes of data in the computing spaces that are isolated from each other are isolated from each other. The integrated vector set includes n original vectors mapped to different computing spaces. Subsequently performing calculation on the integrated vector is equivalent to performing, in different computing spaces (calculation processes) that are isolated from each other, calculation on original vectors mapped to the computing spaces. Subsequently, the first party performs a homomorphic operation on the original matrix of the first party and the encrypted integrated vector to obtain the encrypted result vector. The encrypted result vector is equivalent to a vector obtained by encrypting a multiplication result of the integrated vector and the original matrix. Then the first party determines the data processing result based on at least the encrypted result vector, and sends the data processing result to the second party, so that the second party obtains the multiplication calculation result of the original matrix and the n original vectors based on the data processing result. In the previously described process, the two parties do not leak plaintexts of the original matrix and the original vectors. Therefore, a secure privacy multiplication operation is implemented. In addition, the n original vectors are encoded into one integrated vector, so that the two parties implement multiplication of the original matrix and the n original vectors through one time of encryption and decryption and one time of interaction communication, in other words, implement conversion of a plurality of multiplication operations into one multiplication operation, thereby reducing a communication amount and a calculation amount and improving calculation efficiency.

BRIEF DESCRIPTION OF DRAWINGS

To describe the technical solutions in embodiments of this application more clearly, the following briefly describes the accompanying drawings needed for describing the embodiments. Clearly, the accompanying drawings in the following description merely illustrate some embodiments of this application, and a person of ordinary skill in the art can derive other drawings from these accompanying drawings without creative efforts.

FIG. 4 is a schematic diagram illustrating a process of jointly processing data by two parties, according to some embodiments;

FIG. 5 is a schematic diagram illustrating a process of jointly processing data by two parties, according to some embodiments;

DESCRIPTION OF EMBODIMENTS

The following describes the technical solutions of the embodiments of this specification in detail with reference to the accompanying drawings.

As previously described, in a process of jointly processing data by a plurality of parties, data privacy security has become a current concern. In a plurality of specific data processing operations, a multiplication operation between data matrices (including vectors) is a common operation in multi-party joint processing, and is also a difficulty in privacy data protection. For example, when a party owns a feature matrix formed by feature data of some service objects, and another party owns a parameter matrix for processing the feature data, to perform joint service processing, a secure multiplication operation needs to be performed on the feature matrix and the parameter matrix.

Figure 1A:
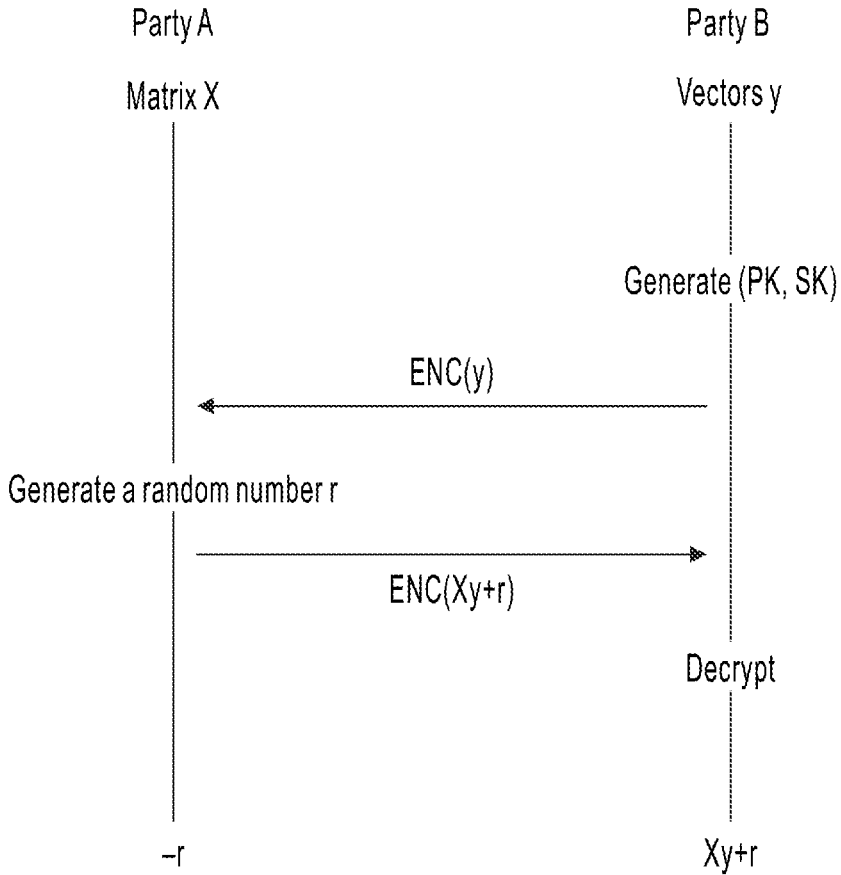
FIG. 1A is a schematic diagram illustrating a process of jointly processing data by two parties, according to related technologies.

In current secure multiplication operations, one time of secure multiplication operation process is performed only for one matrix owned by each party (referred to as one group of matrices). When the two parties need to perform multiplication on a plurality of groups of matrices, a secure multiplication operation process needs to be iteratively performed a plurality of times. One time of secure multiplication operation process in related technologies is shown in FIG. 1A. FIG. 1A shows a calculation process of a matrix X owned by party A and a vector y owned by party B. Specifically, party B generates a public-private key pair (PK, SK) in a homomorphic encryption algorithm, encrypts y by using the public key PK and the homomorphic encryption algorithm, to obtain ENC(y), and sends ENC(y) to party A. Party A first multiplies a plaintext X by the ciphertext ENC(y) by using a plaintext-ciphertext homomorphic operation, to obtain a ciphertext ENC(Xy). In addition, to prevent party B from obtaining a plaintext of Xyiparty A uses a random number to mask Xyiin other words, homomorphically superimposes the generated random number r onto the ciphertext ENC(Xy) to obtain a ciphertext ENC(Xy+r), uses −r as a first-party fragment, and then sends the ciphertext ENC(Xy+r) to party B. Party B decrypts the ciphertext ENC(Xy+r) by using the private key SK, to obtain Xy+r, namely, a second-party fragment. As such, party A and party B each obtain a fragment of Xy. When calculation needs to be respectively performed for the matrix X and a plurality of vectors y, or calculation needs to be respectively performed for a plurality of matrices X and a plurality of vectors y, the previously described process needs to be repeated a plurality of times, in other words, the two parties need to perform a plurality of times of communication and homomorphic encryption operations.

Therefore, the processing methods provided in the embodiments of this specification are mainly designed for scenarios where a secure multi-matrix (multi-vector) multiplication operation is performed between two parties that own privacy data.

Figure 1B:
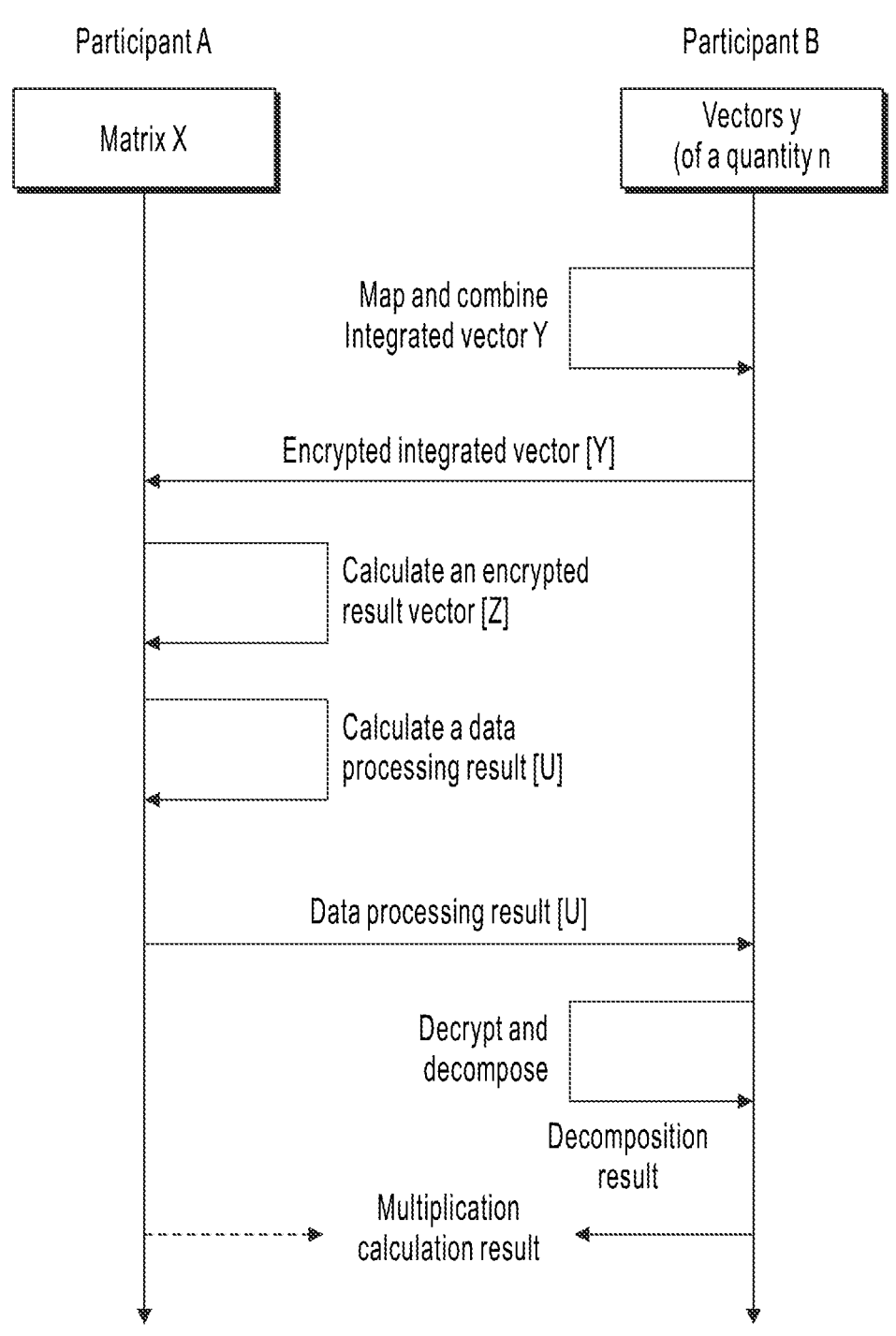
FIG. 1B is a schematic diagram illustrating an implementation framework, according to some embodiments disclosed in this specification.

FIG. 1B is a schematic diagram illustrating an implementation scenario, according to some embodiments disclosed in this specification. In this implementation scenario, participants A and B are schematically shown. Each participant can be specifically implemented as a device, platform, server, or device cluster with computing and processing capabilities. Participant A has an original matrix X formed by privacy data of party A, and there can be one or n matrices X.

Participant B has n original vectors y formed by privacy data of party B. The two parties expect to perform a secure matrix multiplication operation. To be specific, participant A does not leak a plaintext of the original matrix X of participant A, and participant B does not leak a plaintext of the n original vectors y of participant B, but finally a matrix multiplication result is calculated.

In some cases, there is one original matrix X, and a finally calculated matrix multiplication result is products of the original matrix X and the original vectors y, that is, $X^*y_1$, $X^*y_2$, . . . , $X^*y_{i-1}$, $X^*y_i$, $X^*y_{i+1}$, . . . , and $X^*y_n$.

In some other cases, there are n original matrices X, and a finally calculated matrix multiplication result is a product of an $i^{th}$ original matrix $X_i$ and an $i^{th}$ original vector $y_i$ in each group, that is, $X_i^*y_i$, $X_2^*y_2$, . . . , $X_{i-1}^*y_{i-1}$, $X_i^*y_i$, $X_{i+1}^*y_{i+1}$, . . . , and $X_n^*y_n$.

In some example scenarios, participants A and B are respectively a model owner and a data owner, and correspondingly, privacy data in the original matrix X and the n original vectors y are respectively model parameter data of a machine learning model and feature data of a service object. In some other example scenarios, participant A and participant B can alternatively be peers that jointly perform joint model training. Each of them owns a part of model parameter data and feature data. Or, participant A and participant B can be other private data owners that need to perform a secure multiplication operation to perform certain data processing.

In the previously described scenarios, for the purposes of privacy data protection, participant A cannot leak the original matrix X of participant A, and participant B cannot leak the n original vectors y of participant B. The two parties expect to jointly calculate a matrix multiplication result, that is, a product of the original matrix X and each original vector y.

Therefore, according to the embodiments of this specification, participant B that owns the n original vectors y combines mapping results of the n original vectors y in n corresponding computing spaces to obtain an integrated vector Y, performs homomorphic encryption on the integrated vector Y, and sends an encrypted integrated vector [Y] obtained after the encryption to participant A. Participant A performs a homomorphic operation on the encrypted integrated vector [Y] by using the original matrix X of participant A, to obtain an encrypted result vector [Z]; and then determines a data processing result [U] based on at least the encrypted result vector [Z], and sends the data processing result [U] to participant B. Participant B decrypts the data processing result [U], decomposes the data processing result [U] into the n computing spaces to obtain a decomposition result, and obtains, based on the decomposition result, a multiplication calculation result of the original matrix and the n original vectors, namely, results of multiplying the original matrix by the n original vectors.

In the previously described process, the two parties do not leak plaintexts of the original matrix and the original vectors. Therefore, a secure privacy multiplication operation is implemented. In addition, the n original vectors are encoded into one integrated vector, so that the two parties implement multiplication of the original matrix and the n original vectors through one time of encryption and decryption and one time of interaction communication, in other words, implement conversion of a plurality of multiplication operations into one multiplication operation, thereby reducing a communication amount and a calculation amount and improving calculation efficiency. In addition, conversion of a plurality of multiplication operations into one multiplication operation fully uses a homomorphic plaintext space corresponding to the homomorphic encryption algorithm, so that utilization of the space is increased.

The following describes a specific implementation process of the previously described solution.

Figure 2:
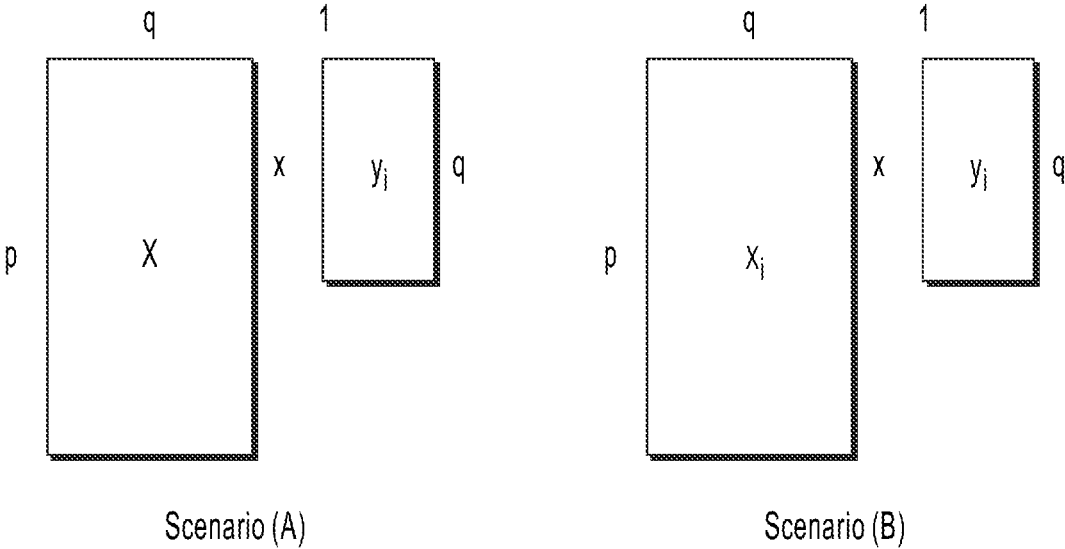
FIG. 2 is a schematic diagram illustrating matrix multiplication performed by two parties.

FIG. 2 is a schematic diagram illustrating matrix multiplication performed by two parties. Continuing with the example of FIG. 1B, FIG. 2 shows participant A and participant B, participant A maintains an original matrix X formed by privacy data, participant B maintains n original vectors y formed by privacy data, and each original vector $y_i$ is a q-dimensional vector.

In some cases, participant A maintains one original matrix, and the original matrix X is a p*q-dimensional matrix. Correspondingly, the two parties expect to securely calculate a product of the original matrix X and each original vector y, that is, $X^*y_1$, $X^*y_2$, . . . , $X^*y_{i-1}$, $X^*y_1$, $X^*y_{i+1}$, . . . , and $X^*y_n$, where each $X^*y_i$ is a p-dimensional vector. These cases are shown in scenario (A) in FIG. 2.

In some other cases, participant A maintains n original matrices, and each original matrix $X_i$ is a p*q-dimensional matrix. Correspondingly, the two parties expect to securely calculate a product of an $i^{th}$ original matrix $X^1$ and an $i^{th}$ original vector $y_i$ in each group, that is, $X_1^*y_1$, $X_2^*y_2$, . . . , $X_{i-1}^*y_{i-1}$, $X_i^*y_i$, $X_{i+1}^*y_{i+1}$, . . . , and $X_i^*y_n$, where each $X_i^*y_i$ is a p-dimensional vector. These cases are shown in scenario (B) in FIG. 2.

Figure 3:
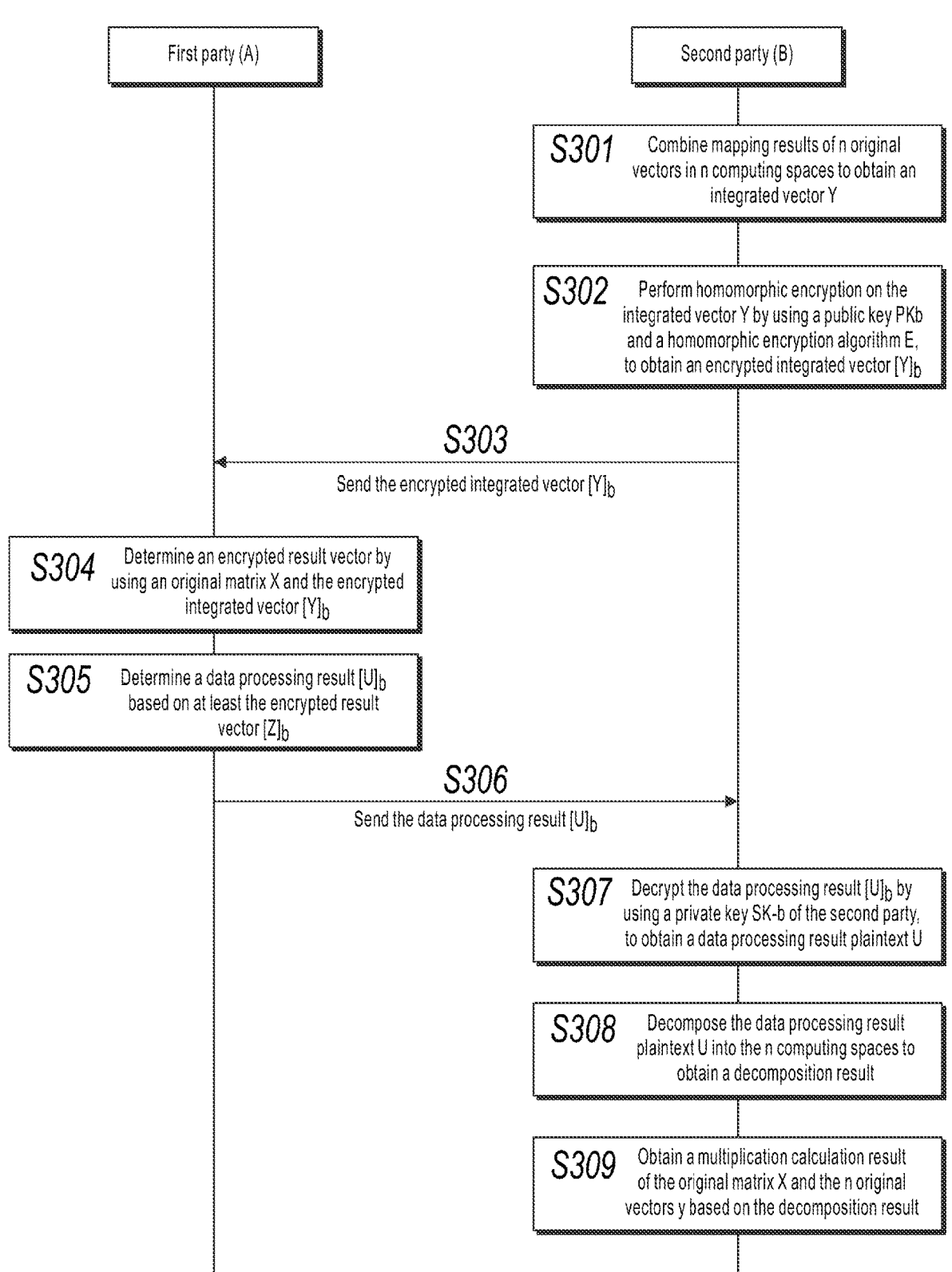
FIG. 3 is a schematic diagram illustrating a process of jointly processing data by two parties, according to some embodiments.

FIG. 3 is a schematic diagram illustrating a process of jointly processing data by two parties, according to some embodiments.

To perform secure matrix multiplication, first, in step S301, a second party combines mapping results of n original vectors in n computing spaces to obtain an integrated vector Y. The n computing spaces need to be different computing spaces that are isolated from each other. In the example of FIG. 3, the second party is participant B. The second party B maps an $i^{th}$ original vector in the n original vectors to an $i^{th}$ space in the n computing spaces, so that calculation is performed on the $i^{th}$ original vector in the $i^{th}$ space. Because the n computing spaces are different from each other and are isolated from each other, calculation processes of data in the computing spaces that are isolated from each other are isolated from each other, in other words, calculation performed on the $i^{th}$ original vector in the $i^{th}$ space does not affect calculation performed on a corresponding original vector in another computing space, and is not affected by calculation performed on the corresponding original vector in the another computing space.

The second party B combines the mapping results of the n original vectors in the n computing spaces, to encode the n original vectors mapped to the n computing spaces into one vector to obtain the integrated vector Y. The integrated vector Y is equivalent to integrating the n original vectors mapped to the different computing spaces. The n computing spaces are different from each other and are isolated from each other, in other words, calculation processes are isolated from each other and do not affect each other, so that subsequent calculation of the integrated vector is equivalent to calculation respectively performed on the corresponding original vectors in the n computing spaces, and calculation of the original vectors in the different computing spaces is isolated from each other and does not affect each other. In some cases, a specific type of the n computing spaces is related to a quantity of original matrices X owned by the first party A. The integrated vector can also be referred to as an integrated original vector.

In some embodiments of this specification, different computing spaces are used for performing calculation on different original vectors y, and space sizes of the computing spaces are determined based on maximum effective bit widths of products of the original matrix X and the original vectors y.

Next, in step S302, the second party B encrypts (that is, homomorphically encrypts) the integrated vector by using a public key owned by the second party B and a homomorphic encryption algorithm, to obtain an encrypted integrated vector $[Y]_b$. The second party B can select a homomorphic encryption algorithm E, and generate a public key PK-b and a private key SK-b in the encryption algorithm. Then the second party B performs homomorphic encryption on the integrated vector Y by using the public key PK-b and the homomorphic encryption algorithm E, to obtain the encrypted integrated vector $[Y]_b$.

In this specification, [ ] is used to represent encryption, and a subscript represents an identifier of the public key used for encryption. It can be understood that the encrypted integrated vector $[Y]_b$ includes a ciphertext element at each location, and each ciphertext element is obtained by performing the previously described homomorphic encryption on an original element at a corresponding location in the integrated vector Y.

Next, in step S303, the second party B sends the encrypted integrated vector $[Y]_b$ to the first party A. Because the vector has been encrypted, privacy data in participant B are not leaked in communication in this step.

Then, in step S304, the first party A determines an encrypted result vector by using the original matrix X and the encrypted integrated vector $[Y]_b$. Specifically, the first party A performs a row-column homomorphic addition operation on plaintext elements in the original matrix X owned by the first party A and ciphertext elements in the encrypted integrated vector $[Y]_b$ to obtain the encrypted result vector $[Z]_b$. When it is desired to calculate a product matrix of X*Y (that is, X and each y), the row-column homomorphic addition operation is performing the homomorphic addition operation on all columns of ciphertext elements in the encrypted integrated vector $[Y]_b$ by using all rows of plaintext elements in the original matrix X, to obtain the previously described encrypted result vector $[Z]_b$.

The previously described homomorphic addition operation is a homomorphic operation between a plaintext and a ciphertext corresponding to the homomorphic encryption algorithm E, and the homomorphic addition operation can be used to enable the encrypted result vector $[Z]_b$ obtained by performing the row-column homomorphic addition operation on the plaintext matrix X and the ciphertext vector $[Y]_b$ to correspond to a vector obtained by encrypting a plaintext X*Y by using the same public key PK-b and the homomorphic encryption algorithm E, that is, $[Z]_b=[X*Y]_b$. This is determined by the "homomorphism" of the homomorphic encryption algorithm. The following describes the process in detail.

It should be understood that the homomorphic encryption algorithm is such an encryption function that a result of performing an operation on a plaintext and then performing encryption is equivalent to a result of performing encryption and then performing a corresponding operation on a ciphertext. For example, $v_1$ and $v_2$ are encrypted by using the same public key PK, to obtain $E_{pK}(v_1)$ and $E_{PK}(v_2)$. If the following equation is satisfied:

$$E_{PK}(v_1+v_2)=E_{PK}(v_1)\oplus E_{PK}(v_2) \tag{1}$$

it is considered that the encryption algorithm satisfies addition homomorphism, where $\oplus$ is a corresponding homomorphic addition operation.

For example, the Paillier algorithm is a common encryption algorithm that satisfies addition homomorphism. The Paillier algorithm satisfies $E_{PK}(v_1+v_2)=E_{PK}(v_1)\cdot E_{PK}(v_2)$, and in this case, multiplication $E_{PK}(v_1)\cdot E_{PK}(v_2)$ of ciphertexts corresponds to a homomorphic addition operation.

It is easy to verify that the Paillier encryption algorithm further satisfies the following equation:

$$E_{PK}(v_1)^{a1}*E_{PK}(v_2)^{a2}=E_{PK}(v_1*a_1+v_2*a_2) \tag{2}$$

Equation (2) can be used as a basis for a homomorphic addition operation between a plaintext and a ciphertext in the Paillier algorithm.

For example, assume that the original matrix X includes a certain row of q plaintext elements $(x_1, x_2, \ldots, x_q)$, and the encrypted integrated vector $[Y]_b$ includes a column of q ciphertext elements $(c_1, c_2, \ldots, c_q)$, where any ciphertext $c_i$ is obtained by encrypting a corresponding element $Y_i$ in the integrated vector Y, that is, $c_i=E_{PK-b}(Y_i)$. In this case, a homomorphic addition operation between the plaintext elements and the ciphertext elements can be implemented as follows:

$$z=c_1^{x1}*c_2^{x2}*\ldots*c_q^{xq} \tag{3}$$

To be specific, a power operation is performed on each $i^{th}$ ciphertext element $c_i$ by using an $i^{th}$ plaintext element $x_i$, to obtain q power operation results. A homomorphic addition result z is obtained based on multiplication of the q power operation results, and is used as an element in the encrypted integrated vector $[Y]_b$.

With reference to equation (2), it can be seen that equation (3) can also be written as:

$$z=E_{PK-b}(x_1*Y_1+x_2*Y_2+\ldots+x_q*Y_q) \tag{4}$$

As such, a result obtained by performing the previously described homomorphic addition operation on a $j^{th}$ row of plaintext elements in the original matrix X and the column of ciphertext elements in the encrypted integrated vector $[Y]_b$ can be used as an element $z_j$ of a $j^{th}$ row in the encrypted integrated vector. In addition, as shown in equation (4), the element $z_j$ is actually equal to an encrypted value of a corresponding element in the plaintext X*Y of the original matrix X and the integrated vector Y.

Therefore, the encrypted result vector $[Z]_b$ obtained by performing the row-column homomorphic addition operation on the plaintext original matrix and the encrypted integrated vector $[Y]_b$ corresponds to a vector obtained by encrypting a product of the original matrix X and the integrated vector Y by using the same public key PK-b and the homomorphic encryption algorithm E. In other words, the following equation (5) can be obtained:

$$[Z]_b=[X*Y]_b \tag{5}$$

The homomorphic addition operation is previously described with reference to the Paillier algorithm. It can be understood that there are already a plurality of homomorphic encryption algorithms, and any encryption algorithm with addition homomorphism in the plurality of homomorphic encryption algorithms can be used in the solutions. For example, other elliptic curve encryption-based algorithms similar to the Paillier algorithm also satisfy addition homomorphism. In addition, as a quasi-fully homomorphic encryption algorithm, the Gentry algorithm not only satisfies addition homomorphism but also satisfies multiplication homomorphism. Correspondingly, different homomorphic encryption algorithms have different homomorphic addition operation forms. For example, if a homomorphic addition operation of a homomorphic encryption algorithm corresponds to conventional addition, the previously described homomorphic addition operation on the plaintext elements and the ciphertext elements can correspond to a linear combination of the plaintext elements and the ciphertext elements.

As such, in the previously described step S304, the first party A calculates the encrypted result vector $[Z]_b$.

Then, in step S305, the first party A determines a data processing result $[U]_b$ based on at least the encrypted result vector $[Z]_b$. The data processing result $[U]_b$ is also data encrypted by using the homomorphic encryption algorithm, namely, a ciphertext, and does not leak privacy data of the first party A and the second party B.

In step S306, the first party A sends the data processing result $[U]_b$ to the second party B.

Then, in step S307, after receiving the data processing result $[U]_b$, the second party B decrypts the data processing result $[U]_b$ by using the private key SK-b of the second party, to obtain a data processing result plaintext U.

Then, in step S308, the data processing result plaintext U is decomposed into the n computing spaces to obtain a decomposition result. The decomposition result includes n decomposition vectors, each computing space corresponds to one decomposition vector, and each decomposition vector is determined based on at least the original matrix X and an original vector mapped to a corresponding computing space.

In step S309, the second party B obtains a multiplication calculation result of the original matrix X and the n original vectors y based on the decomposition result. When there is one original matrix X, the second party B can obtain a multiplication calculation result of the original matrix X and an $i^{th}$ original vector $y_i$ based on an $i^{th}$ vector in the n decomposition vectors. When there are n original matrices X, the second party B can obtain a multiplication calculation result of an $i^{th}$ original matrix $X_i$ and an $i^{th}$ original vector $y_i$ based on an $i^{th}$ vector in the n decomposition vectors. Verification on the multiplication calculation result of the original matrix X and the n original vectors y that is obtained based on the decomposition result will be described later.

In some cases, when the second party B is allowed to obtain a product plaintext of the original matrix X and each original vector y, step S305 can be specifically set to determining the encrypted result vector $[Z]_b$ as the data processing result. Further, step S306 can be specifically set as follows: The first party A sends the data processing result, namely, the encrypted result vector $[Z]_b$, to the second party B.

Step S307 is specifically set as follows: After receiving the encrypted result vector $[Z]_b$, the second party B decrypts the encrypted result vector $[Z]_b$ by using the private key SK-b of the second party B, to obtain a result vector Z, namely, the data processing result plaintext, that is, the product of the original matrix X and the integrated vector Y.

Then step S308 is specifically set as follows: The second party B decomposes the result vector Z into the n computing spaces to obtain the decomposition result. Step S309 is specifically set as follows: The second party B obtains the multiplication calculation result of the original matrix X and the n original vectors y based on the decomposition result.

In some other cases, to protect a multiplication calculation result plaintext of the original matrix X and each original vector y and protect privacy data security of the first party A and the second party B, the first party A masks the encrypted result vector $[Z]_b$ by using a random vector after obtaining the encrypted result vector $[Z]_b$, so that the second party B cannot obtain the multiplication calculation result plaintext of the original matrix X and each original vector y.

Correspondingly, in these cases, step S305 can be specifically set as follows: Step S3051: The first party A generates n random vectors r, and uses opposite numbers −r of the n random vectors r as n first-party fragments of the multiplication calculation result, so that the first party A can subsequently obtain the multiplication calculation result with reference to n second-party fragments of the second party B.

Step S3052: The first party A combines mapping results of the n random vectors r in the n computing spaces to obtain an integrated random vector R. In this step, the mapping results of the n random vectors in the n computing spaces are combined, to be specific, an $i^{th}$ random vector $r_i$ in the n random vectors r is mapped to an $i^{th}$ computing space for combination, to encode the n random vectors into one vector to obtain the integrated random vector R.

Step S3053: The first party A determines the data processing result $[U]_b$ based on the integrated random vector R and the encrypted result vector $[Z]_b$. In some implementations, the first party A performs homomorphic encryption on the integrated random vector R by using the same public key PK-b and the homomorphic encryption algorithm E, to obtain an encrypted integrated random vector $[R]_b$. Then the first party A homomorphically superimposes the encrypted integrated random vector $[R]_b$ onto the encrypted result vector $[Z]_b$ to obtain the data processing result $[U]_b$.

Correspondingly, in step S306, the first party A sends the data processing result $[U]_b$ to the second party B. Then, in step S307, after receiving the data processing result $[U]_b$, the second party B decrypts the data processing result $[U]_b$ by using the private key SK-b of the second party, to obtain the data processing result plaintext U. In step S308, the data processing result plaintext U is decomposed into the n computing spaces to obtain the decomposition result. In step S309, the n second-party fragments are determined based on the decomposition result. As such, the first party and the second party respectively obtain the first-party fragments and the second-party fragments, and the fragments of the two parties are used as the multiplication calculation result of the original matrix and the n original vectors together.

In the previously described implementations, to protect privacy data security of the first party A and the second party B, the first party A generates the random vector r to mask element products of the original matrix X and the n original vectors y. In these cases, to ensure a masking effect, an effective bit width of the random vector r needs to be greater than maximum effective bit widths of the product elements of the original matrix X and the n original vectors y. Correspondingly, a bit width can be set to enable the bit width of the random vector to be greater than the maximum effective bit widths of the element products of the original matrix X and the n original vectors y, and the bit width can be referred to as an excess mask bit width. Correspondingly, the effective bit width of the random vector r is determined based on a maximum effective bit width of an element product of the original matrix X and each original vector y and the excess mask bit width. For example, the effective bit width of the random vector r can be set to a sum of the maximum effective bit width of the element product of the original matrix X and each original vector y and the excess mask bit width.

Different excess mask bit widths can be set for different random vectors r, in other words, the $i^{th}$ random vector r corresponds to an $i^{th}$ excess mask bit width $d_i$. Or, a same excess mask bit width d can be set for all random vectors r. The following embodiments involving the random vector r are described by using an example in which excess mask bit widths d that are set for different random vectors r are the same. A calculation process in which excess mask bit widths d that can be set for different random vectors r are different is similar, and is not repeated for simplicity.

In some specific embodiments of this specification, a specific type of the computing space can be determined based on a quantity of original matrices X owned by the first party. For example, if the first party A owns one original matrix X, in other words, when a multiplication calculation result (product), that is, $X*y_1$, $X*y_2$, . . . , and $X*y_n$, of the original matrix X and each original vector y needs to be calculated, n spaces with different quantities of bits in a current numeral system can be selected as the n computing spaces, so that calculation processes of the n original vectors y are isolated by using the n spaces with different quantities of bits.

When the first party A owns n original matrices X, in other words, a product of an $i^{th}$ original matrix $X_i$ in the n original matrices X and the $i^{th}$ original vector $y_i$ in the n original vectors y needs to be calculated, modulo spaces corresponding to n coprime modulus values can be selected as the n computing spaces, so that calculation processes of the n original vectors y are isolated by using the modulo spaces with n coprime modulus values.

The following describes specific embodiments of implementing parallel processing of secure matrix multiplication for the previously described two cases.

FIG. 4 is a schematic diagram illustrating a process of jointly processing data by two parties, according to some embodiments. A first party A owns one original matrix X, and a multiplication calculation result (product), that is, $X*y_1$, $X*y_2$, . . . , and $X*y_n$, of the original matrix X and each original vector y needs to be calculated.

In the embodiments, n spaces with different quantities of bits in a current numeral system are selected as n computing spaces. The current numeral system can be any numeral system such as a binary numeral system or a decimal numeral system. In the following embodiments, a base-e numeral system is used to represent the current numeral system. Quantities of bits corresponding to the previously described n computing spaces are respectively denoted as $I_1$, $I_2$, . . . , and $I_n$. For simplicity, assume that $I_1$, $I_2$, . . . , and $I_n$ are sorted in ascending order of values. Therefore, the n computing spaces can be represented as ($e^{I_1}$, $e^{I_2}$, . . . , $e^{I_n}$).

As shown in FIG. 4, to perform secure matrix multiplication, first, in step S401, a second party B extends elements in an $i^{th}$ original vector $y_i$ in n original vectors by a quantity, $I_i$, of bits corresponding to an $i^{th}$ space in the n computing spaces, to obtain an $i^{th}$ mapped original vector. Therefore, the $i^{th}$ mapped original vector can be represented as $y_i*e^{I_i}$.

Then, in step S402, an integrated vector Y is determined based on a sum of mapped original vectors. Therefore, the integrated vector can be represented by using the following equation (6):

$$Y = y_1*e^{I_1} + y_2*e^{I_2} + y_3*e^{I_3} + \ldots + y_i*e^{I_i} + \ldots + y_n*e^{I_n} \tag{6}$$

As previously described, the n computing spaces need to be isolated from each other, to ensure that mapping results of the spaces do not affect each other when being combined together. Therefore, for the mapping and combination shown in equation (6), it needs to be ensured that an interval between the quantities ($I_1$, $I_2$, . . . , and $I_n$) of bits of the n computing space is large enough, so that the spaces satisfy an isolation condition, to be specific, in any $i^{th}$ space, after a corresponding matrix element and vector element are subsequently multiplied (and after a random vector is superimposed), no overflow to a next space occurs.

In some embodiments, the bit quantity interval between the n computing spaces is manually set to be large enough to ensure that the previously described isolation condition is satisfied.

In some implementations, the quantity of bits of the computing spaces are determined based on maximum effective bit widths (namely, bit quantities) of element products of the original matrix X and the original vectors. For example, a difference between quantities of bits of the $i^{th}$ space and an $(i-1)^{th}$ space can be determined based on a maximum effective bit width of an element product of the original matrix X and an $(i-1)^{th}$ original vector.

Further, when a random vector r is added, an excess mask bit width of the random vector is further considered. Specifically, in some embodiments, the bit quantity interval between the spaces can be set as follows: The difference between the quantities of bits of the $i^{th}$ space and the $(i-1)^{th}$ space is determined based on the maximum effective bit width $t_{i-1}$ of the element product of the original matrix X and the $(i-1)^{th}$ original vector and excess mask bit widths d predetermined for n random vectors. For example, let $T_{i-1}=t_{i-1}+d$, which can represent impact of product calculation on bit quantity extension of the $(i-1)^{th}$ space. In this case, the quantity of bits of the it space can be determined according to the following equation (7):

$$I_i = I_{i-1} + T_{i-1} \tag{7}$$

As such, after the quantity of bits, $I_1$, of the first space is set, $I_2$, $I_3$, . . . , and $I_n$ can be sequentially determined according to equation (7), to determine the quantities of bits of the n computing spaces.

For ease of calculation, $I_1=0$ and $e^{I_1}=1$ can usually be set, in other words, bit quantity extension is not performed on the first space. Therefore, the quantity of bits of the $i^{th}$ space (i>1) can be determined according to the following equation (8):

$$I_1 = T_1 + T_2 + \ldots + T_{i-1} \tag{8}$$

As such, the integrated vector Y can be represented by using the following equation (9):

$$Y = y_1 + y_2*e^{T_1} + y_3*e^{T_1+T_2} + \ldots + \\ y_i*e^{T_1+T_2+ \ldots +T_{i-1}} + \ldots + y_n*e^{T_1+T_2+ \ldots +T_{n-1}} \tag{9}$$

In some embodiments, to further ensure space isolation, when the quantity of bits of the $i^{th}$ space is determined according to equation (7), an additional bit width $w_{i-1}$ is added after $T_{i-1}$. In this case, the $i^{th}$ space can be represented as $e^{T_1+w_1+T_2+w_2+ \ldots +T_{i-1}+w_{i-1}}$. Correspondingly, equation (9) can be further modified to the following equation (10):

$$Y = y_1 + y_2*e^{T_1+w_1} + y_3*e^{T_1+w_1+T_2+w_2} + \ldots + \\ y_i*e^{T_1+w_1+T_2+w_2+ \ldots +T_{i-1}+w_{i-1}} + \ldots + \\ y_n*e^{T_1+w_1+T_2+w_2+ \ldots +T_{n-1}+w_{n-1}} \tag{10}$$

In some other embodiments, the bit quantity interval T is determined by comprehensively considering a maximum effective bit width of an element product of the original matrix X and each original vector and an excess mask bit width d and/or an additional bit width w. The bit quantity interval T ensures that no space overflow occurs in calculation of the spaces. Therefore, the quantities of bits of the n computing spaces can be set to progressively increase at equal intervals based on the bit quantity interval T, in other words, a difference between quantities of bits of any $i^{th}$ space and an $(i-1)^{th}$ space is T. In this case, equation (9) can be simply rewritten as equation (11):

$$Y=y_1+y_2*e^T+y_3*e^{2T}+\ldots+$$
$$y_i**e^{(i-1)T}+\ldots+y_n*e^{(n-1)T} \tag{11}$$

The previously described examples describe a plurality of bit quantity setting methods for the n computing spaces. According to equation (6), the elements in the $i^{th}$ original vector $y_i$ are mapped to the $i^{th}$ space by extending the elements in the $i^{th}$ original vector $y_i$ by the quantity of bits corresponding to the $i^{th}$ space. Further, the mapping results of the n original vectors in the n computing spaces are combined to encode the n original vectors into one vector to obtain the integrated vector Y.

Then, in step S403, the second party B encrypts (that is, homomorphically encrypts) the integrated vector Y by using a public key PK-b owned by the second party B and a homomorphic encryption algorithm E, to obtain an encrypted integrated vector $[Y]_b$.

Each element in the integrated vector Y includes elements at a same location of the original vectors y that are mapped to different computing spaces, so that subsequent calculation of the elements in the integrated vector is equivalent to calculation, in different computing spaces, of elements of the original vectors that are mapped to the computing spaces. Because a ciphertext element at each location included in the encrypted integrated vector $[Y]_b$ is obtained by performing the previously described homomorphic encryption on an original element at a corresponding location in the integrated vector Y, the encrypted integrated vector can be represented by the following equation (12):

$$[Y]_b=[y_1*e^{I1}+y_2*e^{I2}+y_3*e^{I3}+\ldots+$$
$$y_i*e^{Ii}+\ldots+y_n*e^{In}]_b \tag{12}$$

Next, in step S404, the second party B sends the encrypted integrated vector $[Y]_b$ to the first party A. Because the vector has been encrypted, privacy data in participant B are not leaked in communication in this step.

In step S405, the first party A determines an encrypted result vector $[Z]_b$ by using the original matrix X and the encrypted integrated vector $[Y]_b$. To be specific, the first party A performs a homomorphic addition operation on all columns of ciphertext elements in the encrypted integrated vector $[Y]_b$ by using all rows of plaintext elements in the original matrix X, to obtain the previously described encrypted result vector. In other words, a product of the original matrix X and the integrated vector Y is encrypted by using the same public key PK-b and the homomorphic encryption algorithm E, to obtain the encrypted result vector, that is, $[Z]_b=[X*Y]_b$. With reference to equation (6) and equation (12), the following equation (13) can be obtained:

$$[Z]_b=[Xy_1*e^{I1}+Xy_2*e^{I2}+Xy_3*e^{I3}+\ldots+$$
$$Xy_i*e^{Ii}+\ldots+Xy_n*e^{In}]_b \tag{13}$$

Then, in step S406, the first party A generates n random vectors $r_1, r_2, \ldots,$ and $r_n$, and uses opposite numbers of the n random vectors as n first-party fragments of the multiplication calculation result. In other words, the first party obtains n first-party fragments: $-r_i, -r_2, \ldots,$ and $-r_n$.

In step S407, the first party A extends elements in an $i^{th}$ random vector in the n random vectors by the quantity of bits corresponding to the $i^{th}$ space, to obtain an $i^{th}$ random mapping result $<r_i>$. For a specific mapping process, references can be made to a mapping process of the $i^{th}$ original vector. Details are omitted here for simplicity.

In step S408, an integrated random vector R is determined based on a sum of random mapping results $<r_i>$. R can be represented by using the following equation (14):

$$R=r_1e^{I1}+r_2*e^{I2}+r_3*e^{I3}+\ldots+r_i*e^{Ii}+\ldots+r_n*e^{In} \tag{14}$$

In step S409, the first party A determines a data processing result $[U]_b$ based on the integrated random vector R and the encrypted result vector $[Z]_b$. In this step, the first party A homomorphically superimposes the integrated random vector R onto the encrypted result vector $[Z]_b$ by using the same public key PK-b and the homomorphic encryption algorithm E, to determine the data processing result $[U]_b$. Based on the homomorphism of the homomorphic encryption algorithm, the data processing result $[U]_b$ is represented as $[U]=[Z+R]_b$. Further, with reference to equations (13) and (14), the following equation (15) can be obtained:

$$[U_b]=[(Xy_1+r_1)*e^{I1}+(Xy_2+r_2)*e^{I2}+$$
$$(Xy_3+r_3)*e^{I3}+\ldots+(Xy_i+r_i)*e^{Ii}+\ldots+$$
$$(Xy_n+r_n)*e^{In}]_b \tag{15}$$

In step S410, the first party A sends the data processing result $[U]_b$ to the second party B.

Then, in step S411, after receiving the data processing result $[U]_b$, the second party B decrypts the data processing result $[U]_b$ by using a private key SK-b of the second party, to obtain a data processing result plaintext U.

Then, in step S412, the second party B decomposes the data processing result plaintext U into the n computing spaces to obtain a decomposition result. In this step, the second party B expands the data processing result plaintext U based on a current numeral system, to obtain the decomposition result. Expanding the data processing result plaintext U based on the current numeral system can be represented by using the following equation (16):

$$U=U_1*e^{I1}-U_2*e^{I2}+U_3*e^{I3}+\ldots+U_i*e^{Ii}+\ldots+U_n*e^{In} \tag{16}$$

With reference to equations (15) and (16), it can be seen that an $i^{th}$ decomposition vector in the decomposition result satisfies $U_i=Xy_i+r_i$.

Next, in step S413, the second party B uses n vectors in the decomposition result as n second-party fragments of the multiplication calculation result. An it second-party fragment is $U_i$, that is, $Xy_i+r_i$. With reference to the $i^{th}$ first-party fragment $-r_i$ owned by the first party, it can be seen that a sum of the $i^{th}$ fragments of the two parties is equal to a product vector $Xy_i$ of the original matrix X and the $i^{th}$ original vector $y_i$.

In the embodiments, the n original vectors are extended by the quantities of bits corresponding to the n computing spaces that are different from each other and are isolated from each other, in other words, the $i^{th}$ original vector $y_i$ is mapped to the $i^{th}$ space, and the mapping results of the original vectors in the computing spaces are combined to encode the n original vectors into one vector; and further, the multiplication calculation result of the original matrix X and the original vectors is obtained by using an operation on one matrix and one vector, so that a communication amount and a calculation amount are reduced and calculation efficiency is improved while secure calculation of privacy data of the parties is ensured.

In some other embodiments of this specification, when the first party A does not generate the random vector r, steps S406 to S408 may not be performed, the encrypted result vector $[Z]_h$ can be directly determined as the data processing result in step S409, and other steps are the same. Details are omitted here for simplicity. Correspondingly, in such cases, the second party B can directly obtain a multiplication calculation result plaintext of the original matrix X and the original vectors based on the data processing result.

FIG. 5 is a schematic diagram illustrating a process of jointly processing data by two parties, according to some other embodiments. A first party A owns n original matrices X, a second party B owns n original vectors, and the two parties need to calculate a multiplication calculation result (product), that is, $X_i*y_i$, $X_2*y_2$, . . . , and $X_n*y_n$, of an $i^{th}$ original matrix $X_i$ in the original matrices X and an $i^{th}$ original vector $y_i$ in the n original vectors y. In some embodiments, modulo spaces corresponding to n modulus values are selected as n computing spaces, and the n modulus values are coprime numbers.

The n modulus values can be n coprime integers that are randomly selected. To ensure that the modulo spaces are isolated from each other and no overflow occurs in calculation of the modulo spaces, the n modulus values need to be large enough, and need to be greater than at least a value of a product of possible elements (plus a possible random vector element used for masking). Therefore, in some implementations, when the first party A generates a random number vector r for masking an element product, a bit width of an $i^{th}$ modulus value in the n modulus values is determined based on a maximum effective bit width ti of an element product of the it original matrix $X_i$ and the $i^{th}$ original vector $y_i$ and excess mask bit widths d predetermined for n random vectors. In some cases, to avoid overflow of an intermediate value and/or a result generated in the calculation process, the bit width $T_i$ of the $i^{th}$ modulus value can be set to be greater than or equal to a sum of the maximum effective bit width $t_i$ of the element product of the $i^{th}$ original matrix $X_i$ and the $i^{th}$ original vector $y_i$ and the excess mask bit widths d predetermined for the n random vectors.

In some other implementations, when the first party A does not generate a random number vector r, a bit width of an $i^{th}$ modulus value is determined based on a maximum effective bit width $t_i$ of an element product of the $i^{th}$ original matrix $X_i$ and the ii original vector $y_i$. Similarly, in these cases, to avoid overflow of an intermediate value and/or a result generated in the calculation process, the bit width $T_i$ of the $i^{th}$ modulus value can be set to be greater than or equal to the maximum effective bit width $t_i$ of the element product of the $i^{th}$ original matrix $X_i$ and the it original vector $y_i$.

In an example shown in FIG. 5, the first party A generates the random number vector r. To perform secure matrix multiplication, first, in step S501, the second party B determines an integrated vector Y by using the Chinese remainder theorem. The integrated vector Y satisfies that a remainder result of performing a modulo operation on an $i^{th}$ modulus value corresponding to an $i^{th}$ space is the $i^{th}$ original vector $y_i$ in the n original vectors.

The first party A can first determine, based on a quantity, n, of original matrices (or original vectors) and the previously described bit width demand, the n coprime modulus values, which are respectively $p_1$, $p_2$, . . . , and $p_n$. The bit width $T_i$ of the $i^{th}$ modulus value $p_i$ is greater than or equal to the sum of the maximum effective bit width $t_i$ of the element product of the $i^{th}$ original matrix $X_i$ and the $i^{th}$ original vector $y_i$ and the excess mask bit width d.

Further, both the first party A and the second party B can determine two operations according to the Chinese remainder theorem. The first operation is an encoding operation CRTEncode, and can be represented as $e=CRTEncode(e_1, e_2, . . . , e_n)$. To be specific, n modulus values $p_1$, $p_2$, . . . , and $p_n$ and n elements $e_1$, $e_2$, . . . , and $e_n$ are known, and an integrated result e can be determined by using the encoding operation, so that e satisfies that a remainder result of performing a modulo operation on the modulus value $p_1$ is $e_1$, a remainder result of performing a modulo operation on the modulus value $p_2$ is $e_2$, and by analogy, a remainder result of performing a modulo operation on the modulus value $p_n$ is $e_n$. In some cases, the encoding operation can be used to obtain a plurality of e satisfying the predetermined modulo condition. To reduce computing spaces, e with a smallest bit width can be selected as a desired result.

The second operation is an inverse process of the first operation, can be referred to as a decoding operation CRT-Decode, and can be represented by using the following equation: $(e_1, e_2, . . . , e_n)=CRTDecode(e)$. To be specific, the n modulus values $p_1$, $p_2$, . . . , and $p_n$ and the integrated result e are known, and the decoding operation is performed on e, to determine that the remainder result of performing a modulo operation on the modulus value $p_1$ is $e_1$, the remainder result of performing a modulo operation on the modulus value $p_2$ is $e_2$, and by analogy, the remainder result of performing a modulo operation on the modulus value $p_n$ is $e_n$.

When the second party B knows the previously described n modulus values and n original vectors, the integrated vector Y can be determined by using the encoding operation in the Chinese remainder theorem, that is, $Y=CRTEncode(y_i, y_2, . . . , y_n)$. The integrated vector Y satisfies that a remainder result of performing a modulo operation on an $i^{th}$ modulus value $p_i$ is the $i^{th}$ original vector $y_i$, to be specific, the integrated vector Y satisfies that a remainder result of performing a modulo operation on the modulus value $p_i$ is $y_1$, a remainder result of performing a modulo operation on the modulus value $p_2$ is $y_2$, and by analogy, a remainder result of performing a modulo operation on the modulus value $p_n$ is $y_n$. Therefore, the integrated vector Y is equivalent to a combination of results of mapping the n original vectors to the n modulo spaces.

Then, in step S502, the second party B encrypts (that is, homomorphically encrypts) the integrated vector Y by using a public key PK-b owned by the second party B and a homomorphic encryption algorithm E, to obtain an encrypted integrated vector $[Y]_b$.

Next, in step S503, the second party B sends the encrypted integrated vector $[Y]_b$ to the first party A. Because the vector has been encrypted, privacy data in participant B are not leaked in communication in this step.

In step S504, the first party A determines an integrated matrix based on the n modulus values and the n original vectors owned by the first party A and by using the Chinese remainder theorem. The integrated matrix satisfies that a remainder result of performing a modulo operation on the $i^{th}$ modulus value corresponding to the $i^{th}$ space is the $i^{th}$ original matrix. The first party A processes the n original matrices in a same way of processing the n original vectors by the second party, to obtain the integrated matrix, to be specific, determines the integrated matrix S by using the encoding operation in the Chinese remainder theorem. $S=CRTEncode(X_1, X_2, . . . , X_n)$. Therefore, the integrated matrix S satisfies that a remainder result of performing a modulo operation on the modulus value $p_1$ is $X_i$, a remainder result of performing a modulo operation on the modulus value $p_2$ is $X_2$, and by analogy, a remainder result of performing a modulo operation on the modulus value $p_n$ is $X_n$.

In step S505, the first party A determines an encrypted result vector $[Z]_b$ based on a homomorphic operation on the integrated matrix S and the encrypted integrated vector [Y]. To be specific, the first party A performs a homomorphic addition operation on all columns of ciphertext elements in the encrypted integrated vector $[Y]_b$ by using all rows of plaintext elements in the integrated matrix S, to obtain the previously described encrypted result vector. In other words, a product of the integrated matrix S and the integrated vector Y is encrypted by using the same public key PK-b and the homomorphic encryption algorithm E, to obtain the encrypted result vector $[Z]_b$, that is, $[Z]_b=[S*Y]_b$.

Then, in step S506, the first party A generates n random vectors $r_1, r_2, \ldots$, and $r_n$, and uses opposite numbers of the n random vectors as n first-party fragments of the multiplication calculation result. In other words, the first party obtains n first-party fragments: $-r_i, -r_2, \ldots$, and $-r_n$.

In step S507, the first party A determines an integrated random vector R by using the Chinese remainder theorem, so that the integrated random vector R satisfies that a remainder result of performing a modulo operation on the $i^{th}$ modulus value $p_i$ corresponding to the $i^{th}$ space is an $i^{th}$ random vector $r_i$. The first party A processes the n random vectors r in a same way of processing the n original matrices, to obtain the integrated random vector R, in other words, determines the integrated random vector R by using the encoding operation in the Chinese remainder theorem. $R=CRTEncode(r_1, r_2, \ldots, r_n)$. As such, the integrated random vector R satisfies that the remainder result of performing a modulo operation on the $i^{th}$ modulus value corresponding to the $i^{th}$ space is the $i^{th}$ random vector.

In step S508, the first party A determines a data processing result $[U]_b$ based on the integrated random vector R and the encrypted result vector $[Z]_b$. In this step, the first party A can homomorphically superimpose the integrated random vector R onto the encrypted result vector $[Z]_b$ by using the same public key PK-b and the homomorphic encryption algorithm E, to determine the data processing result $[U]_b$, that is, $[U]_b=[Z+R]_b$, which can be specifically represented as $[U]_b=[S*Y+R]_b$.

In step S509, the first party A sends the data processing result $[U]_b$ to the second party B.

Then, in step S510, after receiving the data processing result $[U]_b$, the second party B decrypts the data processing result $[U]_b$ by using a private key SK-b of the second party, to obtain a data processing result plaintext U. $U=S*Y+R$.

Then, in step S511, the second party B performs a remainder operation on the data processing result plaintext U for the $i^{th}$ modulus value $p_i$ corresponding to the $i^{th}$ space, to decompose the data processing result plaintext U into the $i^{th}$ space to obtain a decomposition result. The second party B can process the data processing result plaintext U (S*Y+R) based on the previously described decoding operation CRTDecode, and decompose the data processing result plaintext U into the n modulo spaces to obtain the decomposition result.

Specifically, a remainder operation is performed on the data processing result plaintext U (S*Y+R) for a first modulus value $p_i$ corresponding to a first space, in other words, the data processing result plaintext U is decomposed into the first space, to obtain $X_i*y_i+r_i$ (a remainder operation is performed on S for the first modulus value $p_i$ corresponding to the first space to obtain $X_1$, a remainder operation is performed on Y for the first modulus value $p_i$ corresponding to the first space to obtain $y_i$, and a remainder operation is performed on R for the first modulus value $p_i$ corresponding to the first space is $r_i$); a remainder operation is performed on the data processing result plaintext U (S*Y+R) for a second modulus value $p_2$ corresponding to a second space, in other words, the data processing result plaintext U is decomposed into the second space, to obtain $X_2*y_2+r_2$ (a remainder operation is performed on S for the second modulus value $p_2$ corresponding to the second space to obtain $X_2$, a remainder operation is performed on Y for the second modulus value $p_2$ corresponding to the second space to obtain $y_2$, and a remainder operation is performed on R for the second modulus value $P_2$ corresponding to the second space to obtain $r_2$); and by analogy, a remainder operation is performed on the data processing result plaintext U (S*Y+R) for an $n^{th}$ modulus value $p_n$ corresponding to an $n^{th}$ space, in other words, the data processing result plaintext U is decomposed into the $n^{th}$ space, to obtain $X_n*y_n+r_n$ (a remainder operation is performed on S for the $n^{th}$ modulus value $p_n$ corresponding to the $n^{th}$ space to obtain $X_n$, a remainder operation is performed on Y for the $n^{th}$ modulus value $p_n$ corresponding to the $n^{th}$ space to obtain $y_n$, and a remainder operation is performed on R for the $n^{th}$ modulus value $p_n$ corresponding to the $n^{th}$ space to obtain $r_n$).

Next, in step S412, the second party B obtains corresponding second-party fragments based on the decomposition result, to obtain the multiplication calculation result of the n original matrices and the n original vectors with reference to the first-party fragments and the second-party fragments. For example, a multiplication calculation result, $X_i*y_i$, of the $i^{th}$ original matrix $X_i$ and the $i^{th}$ original vector $y_i$ is determined with reference to an $i^{th}$ second-party fragment $X_i*y_i+r_i$ and an $i^{th}$ first-party fragment $-r_i$.

In the embodiments, the n original vectors y and the n original matrices X are respectively mapped to the n modulo spaces to encode the n original vectors y and the n original matrices X into one vector and one matrix; and further, the multiplication calculation result of the original matrices X and the original vectors y is obtained by using an operation on one matrix and one vector, so that a communication amount and a calculation amount are reduced and calculation efficiency is improved while secure calculation of privacy data of the parties is ensured.

In some other embodiments of this specification, to ensure a masking effect of a random vector on the multiplication calculation result of the original matrices X and the original vectors y, a bit width of the random vector r is not less than maximum effective bit widths of element products of the original matrices X and the original vectors y. Correspondingly, a masking effect of an intermediate result corresponding to the random vector r on the intermediate calculation result of the element products of the original matrices X and the original vectors y in the calculation process also needs to be ensured. Specifically, step S508 can be set as follows:

Step S081: The first party A generates a target random vector. Bit widths of elements in the target random vector are determined based on the maximum effective bit widths, the excess mask bit widths, and a quantity of original matrices.

Step S082: The first party A multiplies the target random vector by the n modulus values, and superimposes an obtained multiplication result onto the integrated random vector R to obtain an extended random vector.

Step S083: The first party A homomorphically superimposes the extended random vector onto the encrypted result vector.

In the modulo spaces, a bit width of the $i^{th}$ modulus value corresponding to the $i^{th}$ modulo space is Gi (determined based on a maximum effective bit width of an element product of the $i^{th}$ original matrix and the $i^{th}$ original vector and an excess mask bit width of the $i^{th}$ random vector). Correspondingly, a bit width of (each element in) the integrated matrix S is $nG_i$, and a bit width of the integrated vector Y is $nG_i$. Correspondingly, a bit width of an element product S*Y of the integrated matrix S and the integrated vector Y is $2nG_i$. Correspondingly, it needs to be ensured that a bit width of a vector superimposed onto S*Y exceeds $2nG_i$. In addition, considering a reduction in resources of the computing spaces and a bit width $nG_i$ of the integrated random vector R, a bit width of each element in the target random vector can be determined based on the maximum effective bit widths, the excess mask bit widths, and the quantity of original matrices. For example, the bit width of each element in the target random vector can be not less than $nG_i$.

In some cases, a process of obtaining the extended random vector can be represented by using the following equation (17):

$$K=k*p_1*p_2*p_3*p_n \ldots +R \qquad (17)$$

k represents the target random vector, K represents the extended random vector, p is a dimension, and R is the previously described integrated random vector.

In some other embodiments of this specification, considering that a homomorphic plaintext space size corresponding to the homomorphic encryption algorithm is limited, the first party A and the second party B can determine space needed by all the element products of the original matrices and the original vectors in advance based on at least the maximum effective bit widths of the element products of the original matrices and the original vectors (when the first party A generates the random vectors, references can be further made to the predetermined excess mask bit widths).

When the needed space is greater than the homomorphic plaintext space size, it is determined that multiplication calculation results of the original matrices and the original vectors need to be calculated in batches. Correspondingly, space sizes of the computing spaces corresponding to the original matrices are determined based on at least the maximum effective bit widths of the element products of the original matrices and the original vectors; and further, the n original vectors are selected from an original vector set owned by the second party B based on the space sizes of the computing spaces, in other words, the n original vectors are some vectors in the original vector set, so that a space sum of the n corresponding computing spaces is not greater than the homomorphic plaintext space size corresponding to the homomorphic encryption algorithm.

In some other embodiments of this specification, when the first party A does not generate the random vector r, steps S506 and S507 may not be performed, the encrypted result vector $[Z]_b$ can be directly determined as the data processing result in step S508, and other steps are the same. Details are omitted here for simplicity. Correspondingly, in such cases, the second party B can directly obtain a multiplication calculation result plaintext of the original matrices and the original vectors based on the data processing result.

Figure 6:
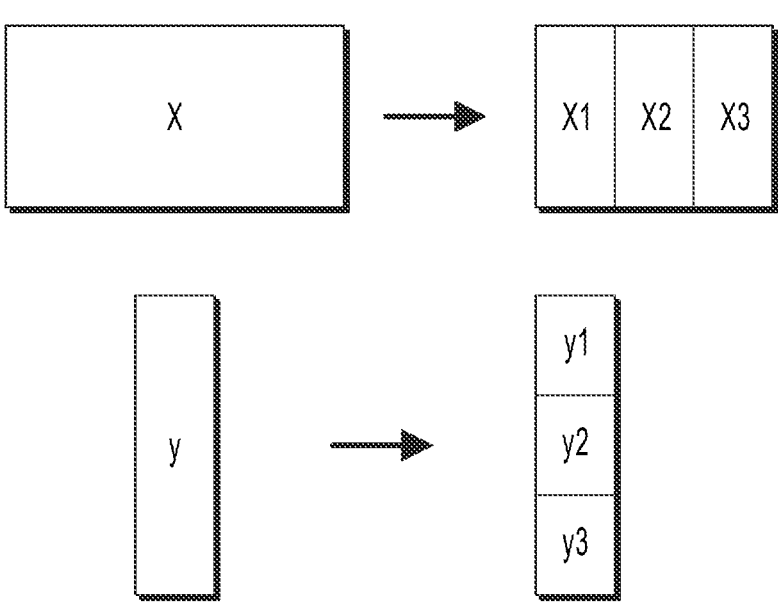
FIG. 6 is a schematic diagram illustrating a process of splitting a matrix and a vector.

In some other embodiments of this specification, if the first party and the second party jointly calculate a multiplication result of one original matrix and one original vector, the original matrix and the original vector can be first split. As shown in FIG. 6, the original matrix is horizontally split, in other words, split by column, to obtain three horizontally arranged submatrices $X_1|X_2|X_3$; and the original vector y is vertically split, in other words, split by row, to obtain three vertically arranged subvectors $y_1|y_2|y_3$. In this case, original matrix*original vector is converted into calculating X1*Y1+X2*Y2+X3*Y3. Correspondingly, processing can be performed by using the previously described procedure of jointly processing data by two parties for data privacy protection provided in the embodiments of this specification.

In some other embodiments of this specification, the computing spaces are n spaces with different quantities of bits in a current numeral system or n modulo spaces corresponding to n modulus values. It can be considered that the n computing spaces can all be used to map a plurality of multiplications into one multiplication. In view of the above-mentioned descriptions, when multiplication calculation results of a plurality of matrices and a plurality of vectors are calculated, n spaces with different quantities of bits in the current numeral system and n different modulo spaces can alternatively be used in combination, in other words, the two types of spaces are used through nesting, to perform corresponding calculation. For example, the first party A includes original matrices X0 and X2, the second party B includes original vectors y0, y1, and y2, and the two parties need to jointly calculate multiplication calculation results of X0*y0, X0*y1, and X2*y2. Specifically, the first party A and the second party B can first jointly calculate X0*y0 and X0*y1. The second party B extends each element in y0 by a quantity of bits, namely, the previously described $I_1$ (i=0), corresponding to a first space, in other words, does not perform bit quantity extension on y0; and extends each element in y1 by a quantity of bits, namely, the previously described $I_2$, corresponding to a second space, to map y0 to the first space, and map y1 to the second space. Further, the second party B determines a sum of a mapping result of y0 mapped to the first space and a mapping result of y1 mapped to the second space as an initial integrated vector y'. Further, the second party B determines a secondary integrated vector by using the Chinese remainder theorem. The secondary integrated vector satisfies that a remainder result of performing a modulo operation on a first modulus value corresponding to the first space is the initial integrated vector y', and a remainder result of performing a modulo operation on a second modulus value corresponding to the second space is y2. The second party B sends the secondary integrated vector to the first party A to perform joint calculation. The previously described process implements secure multiplication calculation by using n spaces with different quantities of bits in the current numeral system and n modulo spaces corresponding to n modulus values together.

This specification provides the following example to describe beneficial effects of the data processing procedure provided in the embodiments of this specification. Assume that the homomorphic plaintext space size corresponding to the homomorphic encryption algorithm is 600 bits.

When the n computing spaces are n spaces with different quantities of bits in the current numeral system, assume that an effective bit width of each of the original matrix X and the original vector y is 30 bits, a quantity of rows of the original matrix X is one million, a maximum effective bit width t of Xy is 80 bits, a predetermined excess mask length d is 20 bits, and a bit width of each computing space is G=100 (80+20) bits, a homomorphic plaintext space can execute at least 600/100=6 computing spaces (multiplications) in parallel. After parallelization, both a quantity of times of transmission and a quantity of times of homomorphic encryption and decryption are ⅙ of the previous ones. Although there are some additional conversion operations, a calculation amount can be ignored compared with a calculation amount of homomorphic encryption and decryption. In the previously described example, if six multiplications are calculated, using the data processing procedure provided in the embodiments of this specification can increase calculation efficiency by approximately six times.

When the n computing spaces are n modulo spaces corresponding to n modulus values, assume that an effective bit width of each of the original matrix X and the original vector y is 30 bits, a quantity of rows of the original matrix X is one million, a maximum effective bit width t of Xy is 80 bits, a predetermined excess mask length d is 20 bits, and a bit width of each computing space is G=200 (2*(80+20)) bits, a homomorphic plaintext space can execute at least 600/2/100=3 multiplications in parallel. After parallelization, both a quantity of times of transmission and a quantity of times of homomorphic encryption and decryption are $\frac{1}{3}$ of the previous ones. Although there are some additional conversion operations, a calculation amount can be ignored compared with a calculation amount of homomorphic encryption and decryption. In the previously described example, if six multiplications are calculated, using the data processing procedure provided in the embodiments of this specification can increase calculation efficiency by approximately three times.

Specific embodiments of this specification are described in the above-mentioned content, and other embodiments fall within the scope of the appended claims. In some cases, actions or steps described in the claims can be performed in a sequence different from that in the embodiments and desired results can still be achieved. In addition, processes described in the accompanying drawings do not necessarily require a specific order or a sequential order shown to achieve the desired results. In some implementations, multitasking and parallel processing are also possible or may be advantageous.

Figure 7:
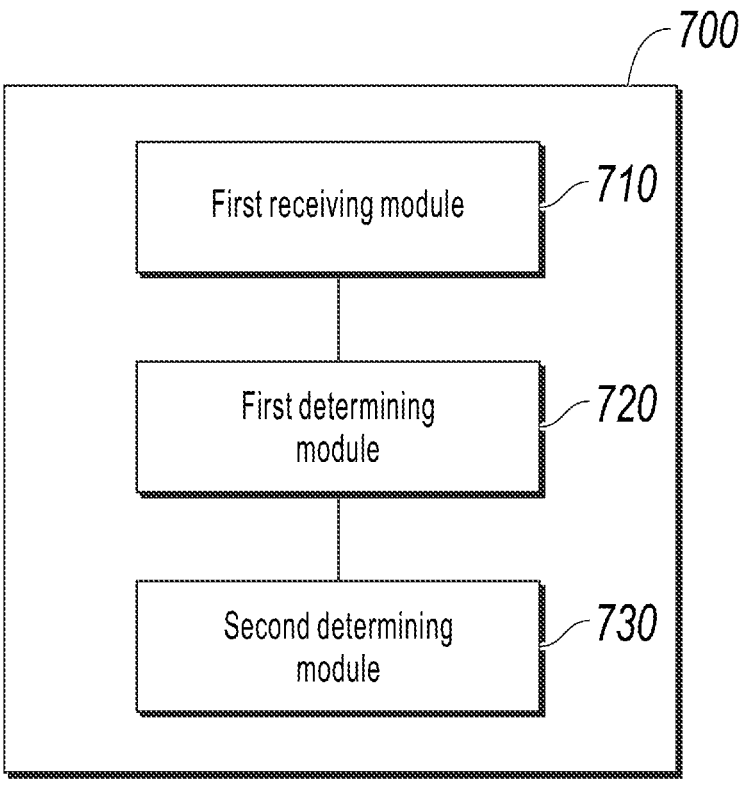
FIG. 7 is a schematic block diagram illustrating an apparatus for jointly processing data by two parties for data privacy protection, according to some embodiments.

Corresponding to the previously described method embodiments, some embodiments of this specification provide an apparatus 700 for jointly processing data by two parties for data privacy protection. A schematic block diagram of the apparatus is shown in FIG. 7. The two parties include a first party and a second party, the first party owns an original matrix formed by privacy data, the second party owns n original vectors formed by privacy data, the apparatus is deployed in the first party, and the apparatus includes: a first receiving module 710, configured to receive an encrypted integrated vector from the second party, where the encrypted integrated vector is obtained by encrypting an integrated vector by using a public key of the second party and a homomorphic encryption algorithm, the integrated vector is a combination of mapping results of the n original vectors in n corresponding computing spaces, and the n computing spaces are different from each other and are isolated from each other; a first determining module 720, configured to determine an encrypted result vector by using the original matrix and the encrypted integrated vector; and a second determining module 730, configured to determine a data processing result based on at least the encrypted result vector, and send the data processing result to the second party, so that the second party obtains a multiplication calculation result of the original matrix and the n original vectors based on the data processing result.

In some optional implementations, space sizes of the n computing spaces are determined based on at least maximum effective bit widths of element products of the original matrix and the original vectors.

In some optional implementations, the second determining module 730 includes: a generation unit (not shown in the figure), configured to generate n random vectors, and use opposite numbers of the n random vectors as n first-party fragments of the multiplication calculation result; a combination unit (not shown in the figure), configured to combine mapping results of the n random vectors in the n computing spaces to obtain an integrated random vector; and a first determining unit (not shown in the figure), configured to determine the data processing result based on the integrated random vector and the encrypted result vector, so that the second party obtains n second-party fragments of the multiplication calculation result.

In some optional implementations, the first party owns one original matrix, and the n computing spaces are n spaces with different quantities of bits in a current numeral system; and the combination unit is specifically configured to extend elements in an $i^{th}$ random vector in the n random vectors by a quantity of bits corresponding to an $(i-1)^{th}$ space, to obtain an $i^{th}$ random mapping result; and determine the integrated random vector based on a sum of random mapping results.

In some optional implementations, a difference between quantities of bits of the it space and an $(i-1)^{th}$ space is determined based on a maximum effective bit width of an element product of the original matrix and an $(i-1)^{th}$ original vector and excess mask bit widths predetermined for the n random vectors.

In some optional implementations, the first party owns n original matrices, the n computing spaces are modulo spaces corresponding to n modulus values, and the n modulus values are coprime numbers; and the first determining module 720 is specifically configured to determine an integrated matrix by using the Chinese remainder theorem, where the integrated matrix satisfies that a remainder result of performing a modulo operation on an $i^{th}$ modulus value corresponding to an $i^{th}$ space is an $i^{th}$ original matrix; and obtain the encrypted result vector based on a homomorphic operation on the integrated matrix and the encrypted integrated vector.

In some optional implementations, the first party owns n original matrices, the n computing spaces are modulo spaces corresponding to n modulus values, and the n modulus values are coprime numbers; the first determining module 720 is specifically configured to determine an integrated matrix by using the Chinese remainder theorem, where the integrated matrix satisfies that a remainder result of performing a modulo operation on an $i^{th}$ modulus value corresponding to an $i^{th}$ space is an $i^{th}$ original matrix; and obtain the encrypted result vector based on a homomorphic operation on the integrated matrix and the encrypted integrated vector; and the combination unit is specifically configured to determine the integrated random vector by using the Chinese remainder theorem, so that the integrated random vector satisfies that a remainder result of performing a modulo operation on the $i^{th}$ modulus value corresponding to the $i^{th}$ space is an it random vector.

In some optional implementations, a bit width of the $i^{th}$ modulus value is determined based on a maximum effective bit width of an element product of the $i^{th}$ original matrix and an it original vector and excess mask bit widths predetermined for the n random vectors.

In some optional implementations, the first determining unit is specifically configured to generate a target random vector, where bit widths of elements in the target random vector are determined based on the maximum effective bit widths, the excess mask bit widths, and a quantity of original matrices; multiply the target random vector by the n modulus values, and superimpose an obtained multiplication result onto the integrated random vector to obtain an extended random vector; and homomorphically superimposing the extended random vector onto the encrypted result vector to obtain the data processing result.

Figure 8:
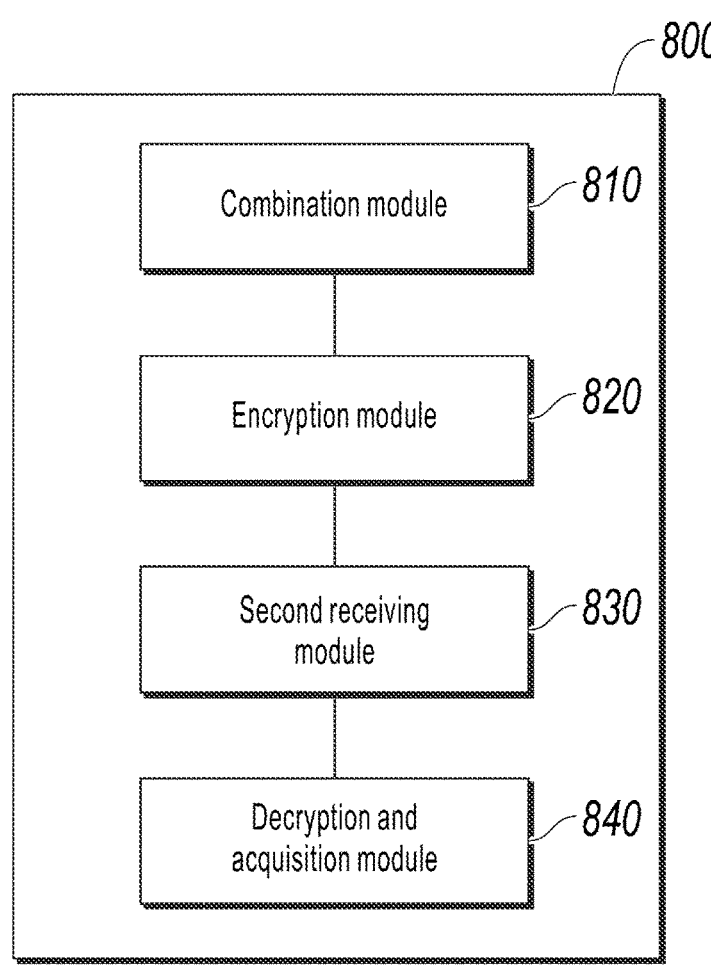
FIG. 8 is another schematic block diagram illustrating an apparatus for jointly processing data by two parties for data privacy protection, according to some embodiments.

Corresponding to the previously described method embodiments, some embodiments of this specification provide an apparatus 800 for jointly processing data by two parties for data privacy protection. A schematic block diagram of the apparatus is shown in FIG. 8. The two parties include a first party and a second party, the first party owns an original matrix formed by privacy data, the second party owns n original vectors formed by privacy data, the apparatus is deployed in the second party, and the apparatus includes: a combination module 810, configured to combine mapping results of the n original vectors in n computing spaces to obtain an integrated vector, where the n computing spaces are different from each other and are isolated from each other; an encryption module 820, configured to encrypt the integrated vector by using a public key of the second party and a homomorphic encryption algorithm, to obtain an encrypted integrated vector, and send the encrypted integrated vector to the first party; a second receiving module 830, configured to receive a data processing result from the first party, where the data processing result is determined by the first party based on at least an encrypted result vector, and the encrypted result vector is determined based on the original matrix and the encrypted integrated vector; and a decryption and acquisition module 840, configured to decrypt the data processing result, decompose the data processing result into the n computing spaces, and obtain a multiplication calculation result of the original matrix and the n original vectors based on a decomposition result.

In some optional implementations, space sizes of the n computing spaces are determined based on at least maximum effective bit widths of element products of the original matrix and the original vectors.

In some optional implementations, the data processing result is determined by the first party based on the encrypted result vector and an integrated random vector, the integrated random vector is obtained by the first party by combining mapping results of n random vectors in the n computing spaces, and opposite numbers of the n random vectors are used as n first-party fragments of the multiplication calculation result; and the decryption and acquisition module 840 is specifically configured to use n vectors in the decomposition result as n second-party fragments of the multiplication calculation result.

In some optional implementations, the first party owns one original matrix, and the n computing spaces are n spaces with different quantities of bits in a current numeral system; and the combination module 810 is specifically configured to extend elements in an $i^{th}$ original vector in n original vectors by a quantity of bits corresponding to an $i^{th}$ space, to obtain an $i^{th}$ vector mapping result; and obtain the integrated vector based on a sum of vector mapping results.

In some optional implementations, the first party owns n original matrices, the n computing spaces are modulo spaces corresponding to n modulus values, and the n modulus values are coprime numbers; and the combination module 810 is specifically configured to determine the integrated vector by using the Chinese remainder theorem, where the integrated vector satisfies that a remainder result of performing a modulo operation on an $i^{th}$ modulus value corresponding to an $i^{th}$ space is an $i^{th}$ original vector.

In some optional implementations, the second party owns an original vector set, and the n original vectors are some vectors in the original vector set, so that a space sum of the n corresponding computing spaces is not greater than a homomorphic plaintext space size corresponding to the homomorphic encryption algorithm.

Figure 9:
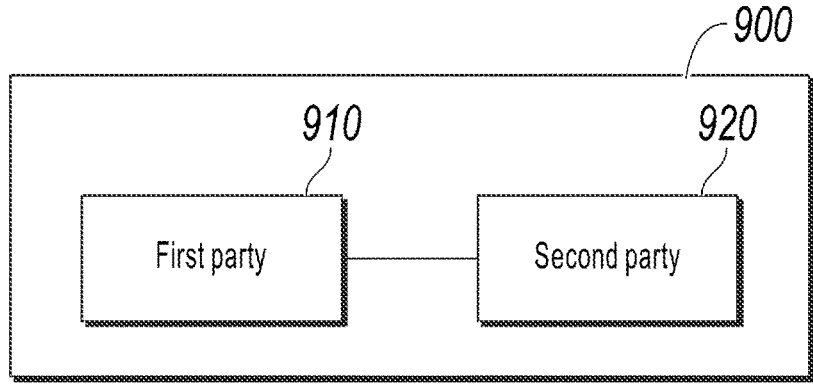
FIG. 9 is a schematic block diagram illustrating a system for jointly processing data by two parties for data privacy protection, according to some embodiments.

Corresponding to the previously described method embodiments, some embodiments of this specification provide a system 900 for jointly processing data by two parties for data privacy protection. A schematic block diagram of the system is shown in FIG. 9. The system 900 includes a first party 910 and a second party 920, the first party 910 owns an original matrix formed by privacy data, and the second party 920 owns n original vectors formed by privacy data.

The second party 920 is configured to combine mapping results of the n original vectors in n computing spaces to obtain an integrated vector, where the n computing spaces are different from each other and are isolated from each other; and encrypt the integrated vector by using a public key of the second party and a homomorphic encryption algorithm, to obtain an encrypted integrated vector, and send the encrypted integrated vector to the first party 910.

The first party 910 is configured to receive the encrypted integrated vector, and determine an encrypted result vector by using the original matrix and the encrypted integrated vector; and determine a data processing result based on at least the encrypted result vector, and send the data processing result to the second party 920.

The second party 920 is further configured to receive the data processing result; and decrypt the data processing result, and decompose the data processing result into the n computing spaces, to obtain a multiplication calculation result of the original matrix and the n original vectors.

In some optional implementations, space sizes of the n computing spaces are determined based on at least maximum effective bit widths of element products of the original matrix and the original vectors.

In some optional implementations, in a process of determining the data processing result based on at least the encrypted result vector, the first party is specifically configured to: generate n random vectors, and use opposite numbers of the n random vectors as n first-party fragments of the multiplication calculation result; combine mapping results of the n random vectors in the n computing spaces to obtain an integrated random vector; and determine the data processing result based on the integrated random vector and the encrypted result vector; and Correspondingly, the obtaining a multiplication calculation result of the original matrix and the n original vectors based on a decomposition result includes the following: using n vectors in the decomposition result as n second-party fragments of the multiplication calculation result.

In some optional implementations, the first party owns one original matrix, and the n computing spaces are n spaces with different quantities of bits in a current numeral system; a process of obtaining the integrated vector by the second party is configured as follows: extending elements in an $i^{th}$ original vector in the n original vectors by a quantity of bits corresponding to an $i^{th}$ space, to obtain an $i^{th}$ vector mapping result; and obtaining the integrated vector based on a sum of vector mapping results; and that the first party combines mapping results of the n random vectors in the n computing spaces includes the following: extending elements in an $i^{th}$ random vector in the n random vectors by the quantity of bits corresponding to the $i^{th}$ space, to obtain an $i^{th}$ random mapping result; and determining the integrated random vector based on a sum of random mapping results.

In some optional implementations, the first party owns one original matrix, and the n computing spaces are n spaces with different quantities of bits in a current numeral system; and a process of obtaining the integrated vector by the second party is configured as follows: extending elements in an $i^{th}$ original vector in the n original vectors by a quantity of bits corresponding to an $i^{th}$ space, to obtain an $i^{th}$ vector mapping result; and obtaining the integrated vector based on a sum of vector mapping results.

In some optional implementations, a difference between quantities of bits of the $i^{th}$ space and an $(i-1)^{th}$ space is determined based on a maximum effective bit width of an element product of the original matrix and an $(i-1)^j$ original vector and excess mask bit widths predetermined for the n random vectors.

In some optional implementations, the first party owns n original matrices, the n computing spaces are modulo spaces corresponding to n modulus values, and the n modulus values are coprime numbers; a process of determining the encrypted result vector by the first party is configured as follows: determining an integrated matrix by using the Chinese remainder theorem, where the integrated matrix satisfies that a remainder result of performing a modulo operation on an $i^{th}$ modulus value corresponding to an $i^{th}$ space is an $i^{th}$ original matrix; and obtaining the encrypted result vector based on a homomorphic operation on the integrated matrix and the encrypted integrated vector; and correspondingly, a process of obtaining the integrated vector by the second party is configured as follows: determining the integrated vector by using the Chinese remainder theorem, where the integrated vector satisfies that a remainder result of performing a modulo operation on the $i^{th}$ modulus value corresponding to the $i^{th}$ space is an $i^{th}$ original vector.

In some optional implementations, the first party owns n original matrices, the n computing spaces are modulo spaces corresponding to n modulus values, and the n modulus values are coprime numbers; a process of determining the encrypted result vector by the first party is configured as follows: determining an integrated matrix by using the Chinese remainder theorem, where the integrated matrix satisfies that a remainder result of performing a modulo operation on an $i^{th}$ modulus value corresponding to an $i^{th}$ space is an $i^{th}$ original matrix; and obtaining the encrypted result vector based on a homomorphic operation on the integrated matrix and the encrypted integrated vector; a process of obtaining the integrated random vector by the first party is configured as follows: determining the integrated random vector by using the Chinese remainder theorem, so that the integrated random vector satisfies that a remainder result of performing a modulo operation on the $i^{th}$ modulus value corresponding to the $i^{th}$ space is an $i^{th}$ random vector; and correspondingly, a process of obtaining the integrated vector by the second party is configured as follows: determining the integrated vector by using the Chinese remainder theorem, where the integrated vector satisfies that a remainder result of performing a modulo operation on the $i^{th}$ modulus value corresponding to the $i^{th}$ space is an $i^{th}$ original vector.

In some optional implementations, a bit width of the $i^{th}$ modulus value is determined based on a maximum effective bit width of an element product of the $i^{th}$ original matrix and an $i^{th}$ original vector and excess mask bit widths predetermined for the n random vectors.

In some optional implementations, a process of determining the data processing result by the first party based on the integrated random vector and the encrypted result vector is specifically configured as follows: generating a target random vector, where bit widths of elements in the target random vector are determined based on the maximum effective bit widths, the excess mask bit widths, and a quantity of original matrices; multiplying the target random vector by the n modulus values, and superimposing an obtained multiplication result onto the integrated random vector to obtain an extended random vector; and homomorphically superimposing the extended random vector onto the encrypted result vector to obtain the data processing result.

The above-mentioned apparatus and system embodiments correspond to the method embodiments. For detailed descriptions, references can be made to the descriptions of the method embodiments, and details are omitted here for simplicity. The apparatus and system embodiments are obtained based on the corresponding method embodiments, and have the same technical effects as the corresponding method embodiments. For detailed descriptions, references can be made to the corresponding method embodiments.

Some embodiments of this specification further provide a computer-readable storage medium. The computer-readable storage medium stores a computer program, and when the computer program is executed on a computer, the computer is enabled to perform the method for jointly processing data by two parties for data privacy protection on the first party side provided in this specification.

Some embodiments of this specification further provide a computer-readable storage medium. The computer-readable storage medium stores a computer program, and when the computer program is executed on a computer, the computer is enabled to perform the method for jointly processing data by two parties for data privacy protection on the second party side provided in this specification.

Some embodiments of this specification further provide a computing device, including a memory and a processor. The memory stores executable code, and when the processor executes the executable code, the method for jointly processing data by two parties for data privacy protection on the first party side provided in this specification is implemented.

Some embodiments of this specification further provide a computing device, including a memory and a processor. The memory stores executable code, and when the processor executes the executable code, the method for jointly processing data by two parties for data privacy protection on the second party side provided in this specification is implemented.

The embodiments of this specification are described in a progressive way. For same or similar parts of the embodiments, mutual references can be made to the embodiments. Each embodiment focuses on a difference from other embodiments. Particularly, the storage medium embodiments and the computing device embodiments are basically similar to the method embodiments, and therefore are described briefly. For a related part, references can be made to the corresponding descriptions in the method embodiments.

A person skilled in the art should be aware that in the above-mentioned one or more examples, functions described in the embodiments of this application can be implemented by hardware, software, firmware, or any combination thereof. When being implemented by software, these functions can be stored in a computer-readable medium or transmitted as one or more instructions or code in the computer-readable medium.

The objectives, technical solutions, and beneficial effects of the embodiments of this application have been described in more detail with reference to the above-mentioned specific implementations. It should be understood that the above-mentioned descriptions are merely specific implementations of the embodiments of this application and are not intended to limit the protection scope of this application. Any modification, equivalent replacement, improvement, etc. made based on the technical solutions of this application shall fall within the protection scope of this application.

The invention claimed is:

1. A computer-implemented method for data privacy protection, comprising:

receiving, by a first party from a second party, an encrypted integrated vector, wherein the first party owns an original matrix formed by privacy data and the second party owns n original vectors formed by privacy data, wherein the encrypted integrated vector is obtained by encrypting an integrated vector based on a public key of the second party and a homomorphic encryption algorithm, the integrated vector is a combination of mapping results of the n original vectors in n computing spaces obtained by mapping the n original vectors to the n computing spaces, and each of the n computing spaces are different and isolated from each other, wherein n is an integer greater than 1, wherein the first party owns the original matrix comprising model parameter data of a data processing model, and wherein the n original vectors comprise feature data of one or more service objects for joint service processing using the data processing model, and wherein the n computing spaces are modulo spaces corresponding to n modulus values that are coprime numbers and wherein the integrated vector is an integrated result obtained by performing an encoding operation CRTEncode according to a Chinese remainder theorem;

determining an encrypted result vector based on performing a row-column homomorphic addition operation on plaintext elements in the original matrix and ciphertext elements in the encrypted integrated vector;

determining a data processing result based on homomorphically superimposing an integrated random vector onto the encrypted result vector; and sending the data processing result to the second party for the second party to obtain a multiplication calculation result of the original matrix and the n original vectors based on decomposing the data processing result into the n computing spaces to obtain the multiplication calculation result, wherein decomposing comprises decrypting the data processing result and performing a decoding operation CRTDecode according to the Chinese remainder theorem, and wherein the second party uses the multiplication calculation result to process the feature data using the data processing model.

2. The method according to claim 1, wherein space sizes of the n computing spaces are determined based on maximum effective bit widths of element products of the original matrix and the n original vectors.

3. The method according to claim 1, wherein the determining a data processing result comprises:

generating n random vectors;

using opposite vectors of the n random vectors as n first-party fragments of the multiplication calculation result;

combining mapping results of the n random vectors in the n computing spaces to obtain an integrated random vector; and determining the data processing result based on the integrated random vector and the encrypted result vector for the second party to obtain n second-party fragments of the multiplication calculation result.

4. The method according to claim 3, wherein the first party owns one original matrix, and the n computing spaces are n spaces with different quantities of bits in a current numeral system, and wherein the combining mapping results of the n random vectors in the n computing spaces comprises:

extending elements in an ith random vector in the n random vectors by a quantity of bits corresponding to an ith space to obtain an ith random mapping result; and determining the integrated random vector based on a sum of random mapping results.

5. The method according to claim 4, wherein a difference between quantities of bits of the ith space and an (i−1)th space is determined based on excess mask bit widths predetermined for the n random vectors and a maximum effective bit width of an element product of the original matrix and an (i−1)th original vector.

6. The method according to claim 1, wherein the first party owns n original matrices, and wherein the determining an encrypted result vector comprises:

determining an integrated matrix by using a Chinese remainder theorem, wherein the integrated matrix satisfies that a remainder result of performing a modulo operation on an ith modulus value corresponding to an ith space is an ith original matrix; and obtaining the encrypted result vector based on a homomorphic operation on the integrated matrix and the encrypted integrated vector.

7. The method according to claim 3, wherein the first party owns n original matrices, wherein the determining an encrypted result vector comprises:

determining an integrated matrix by using the Chinese remainder theorem, wherein the integrated matrix satisfies that a remainder result of performing a modulo operation on an ith modulus value corresponding to an ith space is an ith original matrix; and obtaining the encrypted result vector based on a homomorphic operation on the integrated matrix and the encrypted integrated vector; and wherein the obtaining an integrated random vector comprises:

determining the integrated random vector by using the Chinese remainder theorem, so that the integrated random vector satisfies that a remainder result of performing a modulo operation on the ith modulus value corresponding to the ith space is an ith random vector.

8. The method according to claim 7, wherein a bit width of the ith modulus value is determined based on excess mask bit widths predetermined for the n random vectors and a maximum effective bit width of an element product of the ith original matrix and an ith original vector.

9. The method according to claim 8, wherein the determining the data processing result based on the integrated random vector and the encrypted result vector comprises:

generating a target random vector, wherein bit widths of elements in the target random vector are determined based on maximum effective bit widths, excess mask bit widths, and a quantity of original matrices;

multiplying the target random vector by the n modulus values;

superimposing the multiplication calculation result onto the integrated random vector to obtain an extended random vector; and homomorphically superimposing the extended random vector onto the encrypted result vector to obtain the data processing result.

10. A non-transitory, computer-readable medium storing one or more instructions executable by at least one processor to perform operations comprising:

receiving, by a first party from a second party, an encrypted integrated vector, wherein the first party owns an original matrix formed by privacy data and the second party owns n original vectors formed by privacy data, wherein the encrypted integrated vector is obtained by encrypting an integrated vector based on a public key of the second party and a homomorphic encryption algorithm, the integrated vector is a combination of mapping results of the n original vectors in n computing spaces obtained by mapping the n original vectors to the n computing spaces, and each of the n computing spaces are different and isolated from each other, wherein n is an integer greater than 1, wherein the first party owns the original matrix comprising model parameter data of a data processing model, and wherein the n original vectors comprise feature data of one or more service objects for joint service processing using the data processing model, wherein the n computing spaces are modulo spaces corresponding to n modulus values that are coprime numbers and wherein the integrated vector is an integrated result obtained by performing an encoding operation CRTEncode according to a Chinese remainder theorem;

determining an encrypted result vector based on performing a row-column homomorphic addition operation on plaintext elements in the original matrix and ciphertext elements in the encrypted integrated vector;

determining a data processing result based on homomorphically superimposing an integrated random vector onto the encrypted result vector; and sending the data processing result to the second party for the second party to obtain a multiplication calculation result of the original matrix and the n original vectors based on decomposing the data processing result into the n computing spaces to obtain the multiplication calculation result, wherein decomposing comprises decrypting the data processing result and performing a decoding operation CRTDecode according to the Chinese remainder theorem, and wherein the second party uses the multiplication calculation result to process the feature data using the data processing model.

11. The non-transitory, computer-readable medium according to claim 10, wherein space sizes of the n computing spaces are determined based on maximum effective bit widths of element products of the original matrix and the n original vectors.

12. The non-transitory, computer-readable medium according to claim 10, wherein the determining a data processing result comprises:

generating n random vectors;

using opposite vectors of the n random vectors as n first-party fragments of the multiplication calculation result;

combining mapping results of the n random vectors in the n computing spaces to obtain an integrated random vector; and determining the data processing result based on the integrated random vector and the encrypted result vector for the second party to obtain n second-party fragments of the multiplication calculation result.

13. The non-transitory, computer-readable medium according to claim 12, wherein the first party owns one original matrix, and the n computing spaces are n spaces with different quantities of bits in a current numeral system, and wherein the combining mapping results of the n random vectors in the n computing spaces comprises:

extending elements in an ith random vector in the n random vectors by a quantity of bits corresponding to an ith space to obtain an ith random mapping result; and determining the integrated random vector based on a sum of random mapping results.

14. The non-transitory, computer-readable medium according to claim 13, wherein a difference between quantities of bits of the ith space and an (i−1)th space is determined based on excess mask bit widths predetermined for the n random vectors and a maximum effective bit width of an element product of the original matrix and an (i−1)th original vector.

15. The non-transitory, computer-readable medium according to claim 10, wherein the first party owns n original matrices, wherein the determining an encrypted result vector comprises:

determining an integrated matrix by using a Chinese remainder theorem, wherein the integrated matrix satisfies that a remainder result of performing a modulo operation on an ith modulus value corresponding to an ith space is an ith original matrix; and obtaining the encrypted result vector based on a homomorphic operation on the integrated matrix and the encrypted integrated vector.

16. The non-transitory, computer-readable medium according to claim 12, wherein the first party owns n original matrices, the determining an encrypted result vector comprises:

determining an integrated matrix by using the Chinese remainder theorem, wherein the integrated matrix satisfies that a remainder result of performing a modulo operation on an ith modulus value corresponding to an ith space is an ith original matrix; and obtaining the encrypted result vector based on a homomorphic operation on the integrated matrix and the encrypted integrated vector; and wherein the obtaining an integrated random vector comprises:

determining the integrated random vector by using the Chinese remainder theorem, so that the integrated random vector satisfies that a remainder result of performing a modulo operation on the ith modulus value corresponding to the ith space is an ith random vector.

17. The non-transitory, computer-readable medium according to claim 16, wherein a bit width of the ith modulus value is determined based on excess mask bit widths predetermined for the n random vectors and a maximum effective bit width of an element product of the ith original matrix and an ith original vector.

18. The non-transitory, computer-readable medium according to claim 17, wherein the determining the data processing result based on the integrated random vector and the encrypted result vector comprises:

generating a target random vector, wherein bit widths of elements in the target random vector are determined based on maximum effective bit widths, excess mask bit widths, and a quantity of original matrices;

multiplying the target random vector by the n modulus values;

superimposing the multiplication calculation result onto the integrated random vector to obtain an extended random vector; and homomorphically superimposing the extended random vector onto the encrypted result vector to obtain the data processing result.

19. A computing device comprising:

at least one processor; and one or more memories storing programming instructions for execution by the at least one processor to perform one or more operations comprising:

receiving, by a first party from a second party, an encrypted integrated vector, wherein the first party owns an original matrix formed by privacy data and the second party owns n original vectors formed by privacy data, wherein the encrypted integrated vector is obtained by encrypting an integrated vector based on a public key of the second party and a homomorphic encryption algorithm, the integrated vector is a combination of mapping results of the n original vectors in n computing spaces obtained by mapping the n original vectors to the n computing spaces, and each of the n computing spaces are different and isolated from each other, wherein n is an integer greater than 1, wherein the first party owns the original matrix comprising model parameter data of a data processing model, and wherein the n original vectors comprise feature data of one or more service objects for joint service processing using the data processing model, and wherein the n computing spaces are modulo spaces corresponding to n modulus values that are coprime numbers and wherein the integrated vector is an integrated result obtained by performing an encoding operation CRTEncode according to a Chinese remainder theorem;

determining an encrypted result vector based on performing a row-column homomorphic addition operation on plaintext elements in the original matrix and ciphertext elements in the encrypted integrated vector;

determining a data processing result based on homomorphically superimposing an integrated random vector onto the encrypted result vector; and sending the data processing result to the second party for the second party to obtain a multiplication calculation result of the original matrix and the n original vectors based on decomposing the data processing result into the n computing spaces to obtain the multiplication calculation result, wherein decomposing comprises decrypting the data processing result and performing a decoding operation CRT-Decode according to the Chinese remainder theorem, and wherein the second party uses the multiplication calculation result to process the feature data using the data processing model.

20. The computing device according to claim 19, wherein space sizes of the n computing spaces are determined based on maximum effective bit widths of element products of the original matrix and the n original vectors.

\* \* \* \* \*